United States Patent
Samejima et al.

(10) Patent No.: US 9,380,686 B2
(45) Date of Patent: Jun. 28, 2016

(54) DISCHARGE LAMP LIGHTING APPARATUS AND PROJECTOR

(71) Applicant: USHIO DENKI KABUSHIKI KAISHA, Tokyo (JP)

(72) Inventors: Takanori Samejima, Hyogo (JP); Masashi Okamoto, Hyogo (JP); Isao Miyake, Hyogo (JP)

(73) Assignee: USHIO DENKI KABUSHIKI KAISHI, Tokyo (JP)

( * ) Notice: Subject to any disclaimer, the term of this patent is extended or adjusted under 35 U.S.C. 154(b) by 331 days.

(21) Appl. No.: 13/956,518

(22) Filed: Aug. 1, 2013

(65) Prior Publication Data

US 2014/0036240 A1   Feb. 6, 2014

(30) Foreign Application Priority Data

Aug. 1, 2012   (JP) .................................. 2012-171204

(51) Int. Cl.
| | |
|---|---|
| H05B 37/02 | (2006.01) |
| H05B 41/36 | (2006.01) |
| H05B 41/288 | (2006.01) |
| G03B 21/00 | (2006.01) |

(52) U.S. Cl.
CPC ............ *H05B 41/36* (2013.01); *H05B 41/2887* (2013.01); *G03B 21/005* (2013.01); *Y02B 20/202* (2013.01)

(58) Field of Classification Search
None
See application file for complete search history.

(56) References Cited

U.S. PATENT DOCUMENTS

| | | | | | |
|---|---|---|---|---|---|
| 4,060,751 | A * | 11/1977 | Anderson | ......... | H02M 7/53846 315/209 R |
| 5,349,268 | A * | 9/1994 | Nagai | ................ | H05B 41/2881 315/160 |
| 5,434,474 | A * | 7/1995 | Ukita | ................. | H05B 41/2926 315/127 |
| 5,677,602 | A * | 10/1997 | Paul | .................... | H05B 41/2881 315/224 |
| 5,932,976 | A * | 8/1999 | Maheshwari | ........ | H05B 41/288 315/174 |
| 5,962,981 | A * | 10/1999 | Okude | ................. | H05B 41/042 315/128 |
| 6,160,362 | A * | 12/2000 | Shone | ................ | H05B 41/2883 315/209 R |

(Continued)

FOREIGN PATENT DOCUMENTS

| | | |
|---|---|---|
| JP | H10-133303 A | 5/1998 |
| JP | 2001-142141 A | 5/2001 |

(Continued)

*Primary Examiner* — Crystal L Hammond

(57) ABSTRACT

A polarity-reversal control circuit gives a polarity-reversal order so that the polarity of an inverter is inverted each time the polarity-reversal timing notified by a signal is recognized. The number of times of consecutive appearances of a normal polarity-reversal interval period, in which an interval of adjoining polarity-reversal timings is equal to or less than an upper limit of a polarity-reversal interval desirable for a discharge lamp, is counted, and if the unusual polarity-reversal interval period, in which an interval of the adjoining polarity-reversal timing is longer than the upper limit of a polarity-reversal interval, appears, Npm is memorized as the maximum of the number of times of consecutive appearances and after that, when the polarity-reversals signal in which the number of times of consecutive appearances becomes equal to Npm is received, it is regarded as a start of an unusual polarity-reversal interval period, and additional polarity-reversal order is given.

9 Claims, 8 Drawing Sheets

(56) References Cited

U.S. PATENT DOCUMENTS

| | | | |
|---|---|---|---|
| 6,380,694 B1* | 4/2002 | Uchihashi | H05B 41/2883 315/224 |
| 6,518,712 B2* | 2/2003 | Weng | H05B 41/2883 315/209 R |
| 6,605,906 B2* | 8/2003 | Okamoto | H05B 41/2881 315/225 |
| 6,965,204 B2* | 11/2005 | Langeslag | H05B 41/2883 315/209 R |
| 7,019,468 B2* | 3/2006 | Deurloo | H05B 41/288 315/224 |
| 7,141,937 B2* | 11/2006 | Kumagai | H02M 1/4208 315/224 |
| 7,239,090 B2* | 7/2007 | Okamoto | H05B 41/2881 315/219 |
| 7,332,874 B2* | 2/2008 | Samejima | H05B 41/042 315/274 |
| 7,382,093 B2* | 6/2008 | Suzuki | H05B 41/2885 313/574 |
| 7,486,028 B2* | 2/2009 | Langeslag | H05B 41/2883 315/209 R |
| 7,692,391 B2* | 4/2010 | Nakada | H05B 41/2883 315/209 R |
| 8,358,079 B2* | 1/2013 | Samejima | H05B 41/2925 315/209 R |
| 2001/0038267 A1 | 11/2001 | Ono et al. | |
| 2002/0105288 A1 | 8/2002 | Nakagawa et al. | |
| 2003/0080693 A1 | 5/2003 | Ono et al. | |
| 2004/0000880 A1 | 1/2004 | Ozasa et al. | |
| 2007/0085486 A1* | 4/2007 | Okamoto | H05B 41/2881 315/209 R |
| 2007/0210723 A1* | 9/2007 | Kumagai | H05B 41/288 315/209 M |
| 2010/0084988 A1* | 4/2010 | Nagata | H05B 41/382 315/246 |
| 2011/0037402 A1 | 2/2011 | Ozasa et al. | |
| 2011/0095696 A1* | 4/2011 | Okawa | H05B 41/2887 315/287 |
| 2011/0127926 A1* | 6/2011 | Samejima | H05B 41/2925 315/291 |
| 2011/0210680 A1* | 9/2011 | Yamamoto | H05B 41/2888 315/209 R |

FOREIGN PATENT DOCUMENTS

| | | |
|---|---|---|
| JP | 2001-312997 A | 11/2001 |
| JP | 2002-175890 A | 6/2002 |
| JP | 2003-133091 A | 5/2003 |
| JP | 2003-338394 A | 11/2003 |
| JP | 2004-252112 A | 9/2004 |
| JP | 2004-342465 A | 12/2004 |
| JP | 2005-197181 A | 7/2005 |
| JP | 2006-059790 A | 3/2006 |
| JP | 2006-140016 A | 6/2006 |
| JP | 2006-156414 A | 6/2006 |
| JP | 2006-185663 A | 7/2006 |
| JP | 2007-087637 A | 4/2007 |
| JP | 2008-146837 A | 6/2008 |

* cited by examiner

FIG. 1
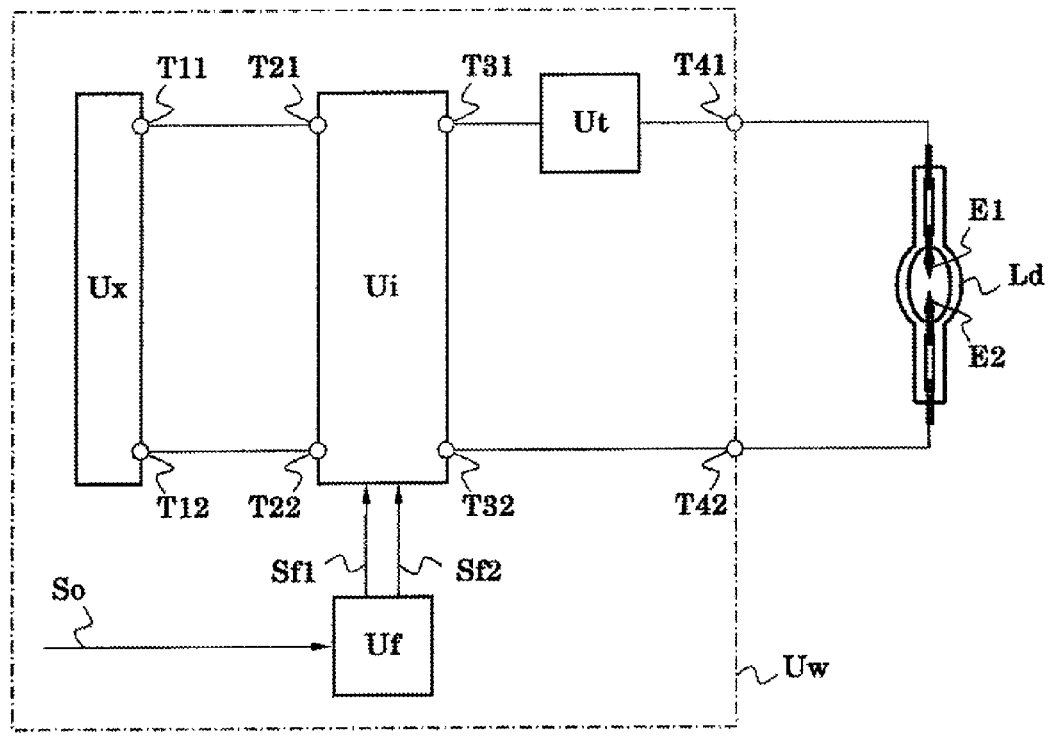
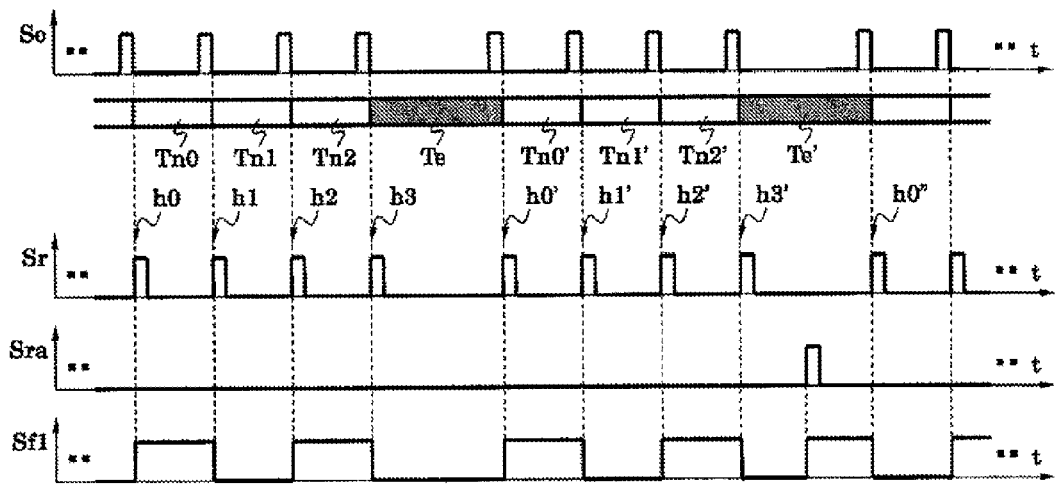
FIG. 2

FIG. 7
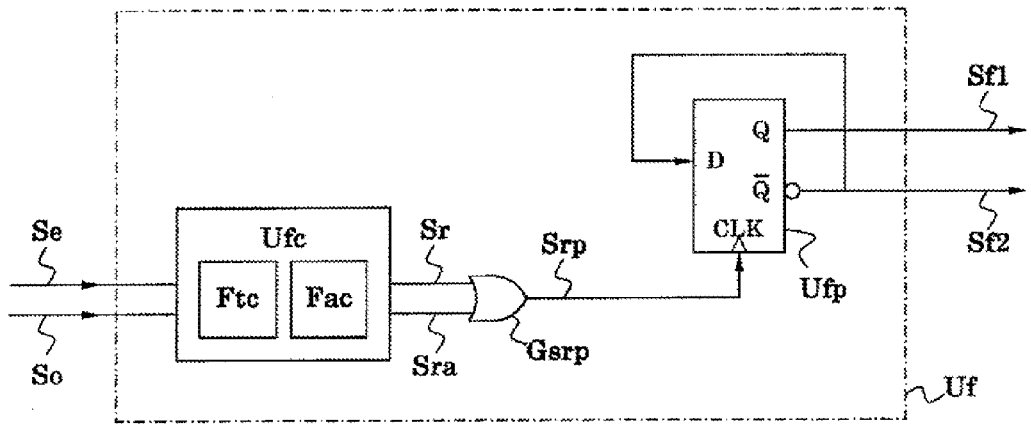
FIG. 8
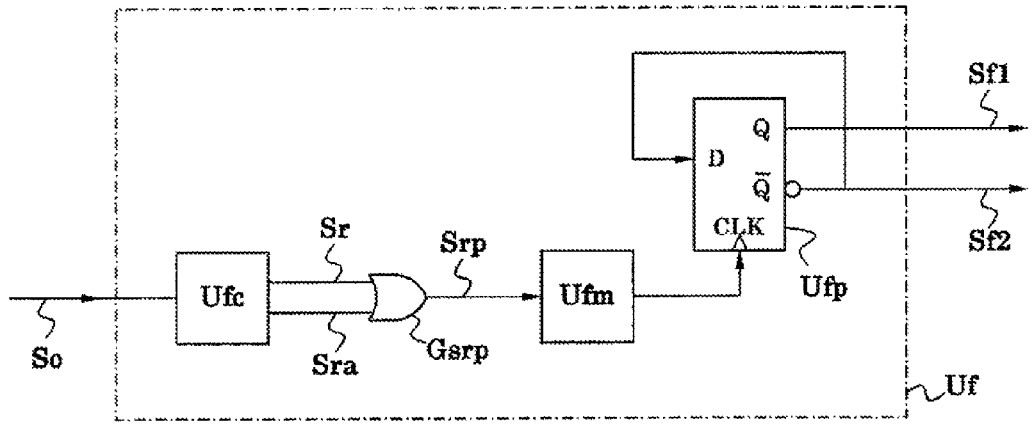
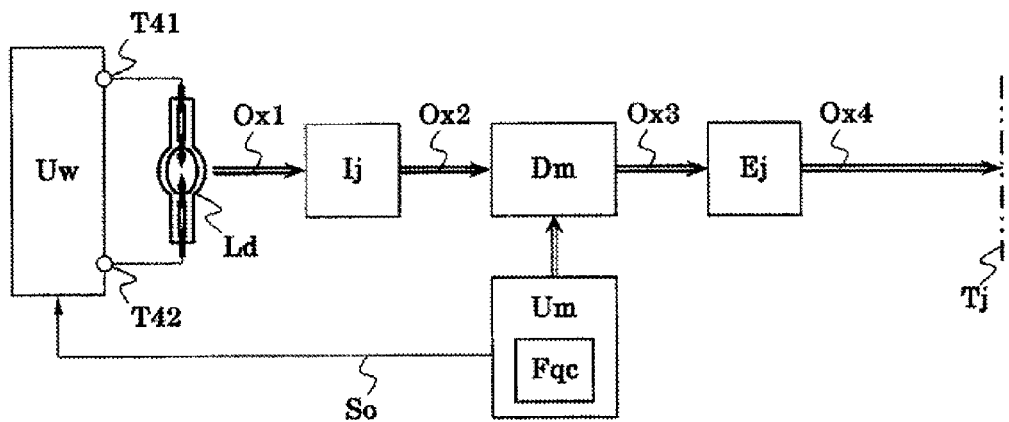
FIG. 9

DISCHARGE LAMP LIGHTING APPARATUS AND PROJECTOR

CROSS-REFERENCES TO RELATED APPLICATION

This application claims priority from Japanese Patent Application Ser. No. 2012-171204 filed Aug. 1, 2012, the contents of which are incorporated herein by reference in its entirety.

TECHNICAL FIELD

The present invention relates to a high pressure discharge lamp used in a projector, and specifically to a discharge lamp lighting apparatus for lighting the high intensity discharge lamp such as a high-pressure mercury lamp, a metal halide lamp, and a xenon lamp, and a projector using such a discharge lamp lighting apparatus.

BACKGROUND

For example, a high intensity discharge lamp such as a xenon lamp and an extra-high pressure mercury lamp has been used in a projector for image display such as a DLP (TM) projector and a liquid crystal projector. As an example, the principle of such a projector is shown in FIG. 10 (reference: Japanese Patent Application Publication No. 2004-252112 etc.).

As described above, light from a light source (UsA), which comprises a high intensity discharge lamp, is inputted into an incident end (PmiA) of a light uniformizing unit (FmA) by, for example, using a condensing unit (not shown), which consists of a concave reflection mirror, a lens, etc., and is outputted from an emission end (PmoA). Here, for example, an optical guide can be used as the light uniformizing unit (FmA), which is also called a rod integrator, a light tunnel, etc., and is formed of a prism, which is made from light transmissive material such as glass, resin, etc., wherein while the light inputted into the incident end (PmiA) is repeatedly and totally reflected on a side face of the light uniformizing unit (FmA) according to the principle, which is the same as that of an optical fiber, it propagates inside the light uniformizing unit (FmA), thereby functioning so that the illuminance on the emission end (PmoA) is sufficiently uniformized even if distribution of the light inputted into the incident end (PmiA) has unevenness.

An illumination lens (Ej1A) is arranged so that a quadrangle image of the emission end (PmoA) is formed on a two-dimensional light amplitude modulation element (DmjA), whereby a two-dimensional light amplitude modulation element (DmjA) is illuminated by light outputted from the emission end (PmoA). However, in FIG. 10, a mirror (MjA) is arranged between the illumination lens (Ej1A) and the two-dimensional light amplitude modulation element (DmjA). And the two-dimensional light amplitude modulation element (DmjA) modulates light on a pixel to pixel basis according to an image signal so that the light may be directed so as to enter the projection lens (Ej2A), or light may be directed so as not to enter there, whereby an image is displayed on a screen (Tj).

Since such a two-dimensional light amplitude modulation element, which is described above is also called a light valve, and in the case of the optical system shown in FIG. 10, in general, a DMD (TM) (Digital Micromirror Device) is often used as the two-dimensional light amplitude modulation element (DmjA).

On the other hand, in case where a LCOS (TM) (Liquid Crystal on Silicon), which is a silicon liquid crystal device, is used as a two-dimensional light amplitude modulation element, a principle diagram thereof is shown in an FIG. 11 as an example of a projector using it (reference: Japanese Patent Application No. 2001-142141 etc.).

Light from a light source (UsB), which comprises a high intensity discharge lamp etc., is inputted, as approximately parallel light flux, into an incident end (PmiB) of a light uniformizing unit (FmB), which is called a fly eye integrator, by using a collimator unit (not shown), which is made up of a concave reflection mirror, a lens, etc., and is outputted from an emission end (PmoB). Here, the light uniformizing unit (FmB) is made up of a combination of an upstream fly eye lens (F1B) on an incident side, a downstream fly eye lens (F2B) on a light emission side, and an illumination lens (Ej1B). The upstream fly eye lens (F1B) and the downstream fly eye lens (F2B) are respectively formed by arranging, in vertical and horizontal directions, many quadrangle lenses whose focal distance is the same as one another and whose shape is the same as one another.

When, based on a focal distance of the upstream fly eye lens (F1B), the downstream fly eye lens (F2B), and the illumination lens (Ej1B), a two-dimensional light amplitude modulation element (DmjB) is arranged at a predetermined position derived from the constitutive theory of a fly eye integrator optical system, the two-dimensional light amplitude modulation element (DmjB) which is an object to be illuminated, is illuminated by the light outputted from the emission end (PmoB). However, the light is reflected towards the two-dimensional light amplitude modulation element (DmjB) in the case of illumination, by arranging a polarization beam splitter (MjB) between the illumination lens (Ej1B) and the two-dimensional light amplitude modulation element (DmjB). And the two-dimensional light amplitude modulation element (DmjB) performs modulation and reflection so as to or so as not to rotate the polarization direction of light by 90 degrees on a pixel to pixel basis according to an image signal, whereby only the rotated light passes through the polarization beam splitter (MjB), and enters the projection lens (Ej3B), so that an image may be displayed on a screen (Tj).

In case of such a liquid crystal device, since only a component of light in a specified polarization direction can be modulated effectively, although a component parallel to the specified polarization direction is usually passed therethrough as it is, only a component perpendicular to the specified polarization direction is rotated by 90 degrees with respect to the polarization direction, so that a polarized-light alignment functional device (PcB) for making all the light effectively usable, is inserted, for example, downstream of the downstream fly eye lens (F2B). Moreover, a field lens (Ej2B) is inserted immediately upstream of the two-dimensional light amplitude modulation element (DmjB) so that approximately parallel light may enter the two-dimensional light amplitude modulation element (DmjB).

In addition to the reflection type of the two-dimensional light amplitude modulation element shown in FIG. 11, a transmissive liquid crystal device (LCD) may be used as the two-dimensional light amplitude modulation element in the optical arrangement which is suitable therefor (reference: Japanese Patent Application Publication No. H10-133303 etc.).

In general, for example, a dynamic color filter such as a color wheel is arranged downstream or upstream side of the light uniformizing unit in a projector in order to display a color image, and the two-dimensional light amplitude modulation element is illuminated with color sequential light flux of R, G and B (Red, Green, Blue), whereby color display is realized in a time dividing manner, or a dichroic mirror or a dichroic prism is arranged downstream of the light uniformizing unit, so that the two-dimensional light amplitude modulation element, which is independently provided in each color, is illuminated with light which is separated into the three primary colors of R, G and B, and a dichroic mirror or a dichroic prism for performing color synthesis of the modulated light flux of the primary colors R, G and B is arranged. However, for ease of explanation, in FIGS. 10 and 11, these elements are omitted.

A discharge lamp lighting apparatus for lighting the above-described discharge lamp is operated so that, at time of initiation thereof, while voltage called no-load open circuit voltage is applied to the lamp, high voltage is impressed to the lamp, so as to generate dielectric breakdown in an electrical discharge space, whereby the discharge state changes from glow discharge to arc discharge and finally a steady lighting state may be realized.

The discharge voltage of the lamp, which is low, for example, about 10 V, immediately after shifting to the arc discharge, gradually increases as the temperature rises, and becomes stable at a fixed voltage in a steady lighting state. In general, such a discharge lamp lighting apparatus has a converter for adjusting an output of an input power source to the discharge voltage of the lamp, so that an output lamp current required in order to realize a predetermined lamp input power may be outputted. Moreover, the discharge lamp lighting apparatus has mechanism for detecting lamp voltage, i.e., the output voltage of the converter, and determining target lamp current based on this information, for example, a value of the quotient obtained by dividing the target electric power by the detected voltage.

The discharge voltage of the lamp in a steady lighting state, i.e., lamp voltage, (VL) has a character in which it become lower as a distance between tips of two electric discharge electrodes, i.e., a distance between electrodes, become short. However, in the case, while the utilization efficiency of the light emitted from the lamp becomes high since it becomes closer to a point light source as the distance between the electrodes becomes shorter, where the same electric power is supplied to the lamp since the lamp voltage (VL) becomes low, there is a disadvantageous aspect in that heat generation of the discharge lamp lighting apparatus becomes large since lamp current (IL) becomes large. On the contrary, while the point light source nature is deteriorated so that the utilization efficiency of light becomes low as the distance between electrodes becomes long, where the same electric power is supplied to the lamp since lamp voltage (VL) becomes high, there is an advantageous aspect in that heat generation of discharge lamp lighting apparatus becomes small since the lamp current (IL) can be small. Therefore, it is not necessarily advantageous or advantageous that the distance between the electrodes is short, and it can be understood that the distance between the electrodes should be maintained between the upper and lower limits, which are specified from the brightness required as a light source for a projector, and the limit of heat generation of the discharge lamp lighting apparatus which can be processed, that is, a predetermined range.

As to types of a driving method of the discharge lamp, there are a direct current driving method in which the lamp is lighted by the converter, and an alternating current driving method in which repeated polarity reversals are performed by further providing an inverter downstream of the converter. In the case of the direct current driving method, since the light flux from the lamp is like direct current, that is, it does not change with passage of time, basically, there is a big advantage that it can be similarly applied to both types of the above-described projectors.

On the other hand, while in the case of alternating current drive system, while there is also a disadvantageous aspect resulting from existence of polarity reversals itself, such as a bad influence on a display image due to instantaneous turning-off and overshooting of light emitted at time of polarity reversals, in the case of the alternating current driving method, development or wear of the electrode(s) of the discharge lamp can be controlled by using the flexibility which does not exist in the direct current driving method such as polarity-reversal frequency.

Japanese Patent Application Publication No. 2001-312997 discloses prior art in which wear-out or growth of electrodes of a discharge lamp is controlled by controlling polarity-reversals frequency etc., and a distance between electrodes is maintained in a desired range, wherein the frequency is set to a first frequency when a distance between electrodes decreases from a normal value due to formation of a projection(s) on a portion(s) where the tips of electrodes of a high pressure discharge lamp face each other, and the frequency is set to a second frequency when the projection(s) decreases so that the distance between the electrodes increases from the normal value.

Moreover, Japanese Patent Application Publication No. 2002-175890 teaches that in alternating current drive of the lamp which has current-proof of regulation of the electrode, a period of 1 second or more where it becomes 5 Hz or less or a period of 1 second or more where lighting current becomes a rated current value or more, is generated.

Further for example, in Japanese Patent Application Publication No. 2003-133091 teaches that when the voltage between electrodes drops below a predetermined value due to a change of a distance between electrodes during lighting, a period where current at frequency lower than the rated frequency is temporarily prepared.

Further for example, Japanese Patent Application Publication No. 2003-338394 teaches that in case of lighting at power lower than the rated power, when voltage between electrodes drops below a predetermined value due to a change of a distance between electrodes, a period, where alternating current at frequency higher than that of lighting current at time of the rated power lighting is supplied, is set for a predetermined period.

Further, for example, Japanese Patent Application Publication No. 2004-342465 teaches that a full bridged circuit is operated in a polarity-reversal operation at alternating frequency, at which a projection(s) of the electrodes tends to be formed, for a definite period immediately after starting an electric discharge lamp, and a polarity-reversal operation is performed at alternating frequency, at which a change to electrodes is small, after passage of the definite period, or when tube voltage of an electric discharge lamp rises, alternating frequency is raised according to it, or a time ratio of positive and negative side in polarity reversals is changed according to the conditions thereof.

Further, for example, Japanese Patent Application No. 2005-197181 teaches that according to the magnitude relation of lamp voltage and switching voltage, polarity-reversal frequency is changed in multiple steps, wherein the frequency is fixed at a predetermined frequency and the lamp is lighted for a predetermined period from the starting time.

Further for example, Japanese Patent Application Publication No. 2006-140016 teaches that the frequency of alternating current is changed in a regular or irregular manner.

Further, for example, Japanese Patent Application Publication No. 2006-156414 teaches that bridge drive frequency is switched and controlled at two or more steps at time of lighting.

Further, for example, Japanese Patent Application Publication No. 2006-185663 teaches that the polarity-reversal frequency of a bridge is changed according to lamp voltage.

Further, for example, Japanese Patent Application Publication No. 2007-087637 teaches that a discharge lamp is lighted while low frequency is inserted when lighting voltage of the lamp is a first predetermined value or more, and low frequency is not inserted when the lighting voltage of the discharge lamp is a second predetermined value or less.

Of course, in many of the technologies, not all can be uniformly applied thereto even in case of an alternating current drive type lamp. That is, some are applicable, and some are not applicable, depending on a lamp design parameters such as electrode structure, dimension thereof, material structure, the constituent and contained amount of an electric discharge medium, form, a size, etc. of a bulb. Even in the applicable case, the range of polarity-reversal frequency, and the value of current must be strictly specified according to the design parameter of each lamp.

In view of the above, it can be understood that in the case of the alternating current drive type, in order to maximize the performance of a lamp and to perform a long life span operation thereof, it is very important to determine the proper polarity-reversal frequency according to the conditions of the lamp at each point of time. However, among the technologies described above, it may possible to use the technology in which the polarity-reversal frequency is gradually changed in a continuous or discontinuous way in order to merely light the lamp. However, the technology cannot be used in order to light the lamp as a light source for a projector.

The reason is as set forth below. Renewal of the state of a pixel(s) is repeated for a short period of time in the two-dimensional light amplitude modulation element (DmjA, DmjB) of a projector, and if updating timing of the pixel and polarity-reversal timing of the lamp is not adjusted for each other, as described above, instantaneous turning-off, overshooting etc. of light emission at time of polarity reversal, arise, thereby causing a bad influence on a display image. Therefore, the two-dimensional light amplitude modulation element driving circuit which drives a two-dimensional light amplitude modulation element (DmjA, DmjB), and a discharge lamp lighting apparatus which drives a lamp, are not individually operated, but it is necessary to perform an operation in cooperation so that the updating timing of a pixel(s) and the polarity-reversals timing of the lamp may be adjusted for each other, so that the synchronized signal for a synchronization is sent towards the discharge lamp lighting apparatus from the two-dimensional light amplitude modulation element driving circuit. Therefore, what can usually be performed in discharge lamp lighting apparatus, is that either polarity reversals are performed according to a synchronized signal, or a synchronized signal is ignored so that the polarity reversals may not be performed, so that without considering the convenience in a two-dimensional light amplitude modulation element driving circuit, based on a matter of convenience in the lamp, the polarity-reversal frequency cannot be gradually changed either in a continuous way or in a discontinuous way.

However, in recent years, in order to further realize a highly efficient and highly functional projector, in an operation of the two-dimensional light amplitude modulation element (DmjA, DmjB) a black screen, i.e., a momentary black screen may be inserted. In addition, a situation, in which the length of a black screen period is not constant, arises. The black screen is inserted in order to smooth a motion of an animation, or to prevent appearance of an imperfect image in a switching time of liquid crystal shutter spectacles, by inserting it between a right eye image and a left eye image in 3D display, wherein as to the length of a black screen insertion period, a variation is given continuously or gradually for a reason that it is adjusted for the switching speed performance etc. of the liquid-crystal shutter spectacles.

This situation is briefly described below, referring to FIGS. 12A and 12B. As shown in FIGS. 12A and 12B, when a black screen period (Pb) is changed from a short one to long one, if the length of one cycle is unchanged, the length of an effective screen period (Pw) other than the black screen period (Pb) becomes short. When the two-dimensional light amplitude modulation element driving circuit generates a polarity reversal notification signal (Sy) at timings (f0, f1, f2, f3, f0', ... ), even if an interval of the polarity reversal notification signal (Sy) generated at timings (f3, f0') corresponding to a start and an end of the black screen period (Pb) is prolonged that shown in FIG. 12A to FIG. 12B, in general, It is difficult to expect to make a two-dimensional light amplitude modulation element driving circuit have a function for appropriately inserting the polarity reversal notification signal (Sy) in the middle thereof.

The reason thereof will be set forth below. As described above, since, in order to maximize the performance of the lamp and to perform a long life span operation thereof, it is necessary to determine the proper polarity-reversal frequency according to the conditions of the lamp at each point of time. Therefore, to appropriately determine whether a polarity-reversal operation should be inserted at the timing (f4) during the period by making a judgment from the length of the interval of the timings (f3, f0'), whether to insert it once, or whether to insert it twice determines correctly whether to insert in two places, is dependent on the design parameter of a lamp to be actually used, so that it is only possible to accomplish it by the discharge lamp lighting apparatus which is designed by maker who design a lamp. It is possible to determine, in advance, the polarity reversal notification signal (Sy) within the effective screen period (Pw) which is generated at timings (f1, f2), based on polarity-reversals frequency of the lamp to be used, that is, a proper value of the polarity-reversal interval which is a reciprocal index, by programming a two-dimensional light amplitude modulation element driving circuit according to a processing sequence performed in that period.

SUMMARY

It is object of the present invention to offer a discharge lamp lighting apparatus and a projector which solves a problem that an additional polarity reversal notification signal is not inserted at proper timing(s) although the length of a time interval of a polarity reversal notification signal changes depending on situations.

A discharge lamp lighting apparatus according to an aspect of a first embodiment of the present invention, comprises: an electric supply circuit (Ux) for causing a discharge lamp (Ld) maintain electric discharge, and supplying predetermined electric power thereto, an inverter (Ui) for carrying out polarity reversals of output voltage of the electric supply circuit (Ux) to be applied to the discharge lamp (Ld), and an inverter control circuit (Uf) which receives a polarity reversal notification signal (So) to be inputted from the outside in order to give a notice of polarity-reversal timing (h0, h1, h2, ... ) of this inverter (Ui), and generates an inverter polarity phase signal (Sf1, Sf2) for specifying a polar phase of the inverter (Ui), wherein the inverter control circuit (Uf) has a polarity-reversal control circuit (Ufc) which manages a polarity-reversal operation of the inverter (Ui) based on the polarity reversal notification signal (So), and an inverter polarity phase generation circuit (Ufp) which generates the inverter polarity phase signal (Sf1, Sf2), wherein the polarity-reversal control circuit (Ufc) gives a polarity-reversal order signal (Sr) to the inverter polarity phase generation circuit (Ufp), as a basic operation, every time the polarity-reversal control circuit (Ufc) recognizes the polarity-reversal timing (h0, h1, h2, . . . ), which is notified by the polarity reversal notification signal (So), so that the polarity of the inverter (Ui) may be inverted, wherein the polarity-reversal control circuit (Ufc) has a period measurement elapsed-time counter (Ftc) which performs a count operation at every predetermined period of time, in which when the polarity-reversal control circuit (Ufc) recognizes polarity-reversals timings (h0, h1, h2, . . . ), after memorizing a count value Ntf of the period measurement elapsed-time counter (Ftc), the polarity-reversal control circuit (Ufc) resets the count value Nt of the period measurement elapsed-time counter (Ftc), and resumes the count operation of the period measurement elapsed-time counter (Ftc), thereby measuring an interval of the polarity-reversals timings (h0, h1, h2, . . . ) which adjoins each other, based on the memorized count value Ntf, the polarity-reversal control circuit (Ufc) has a consecutive appearance times counter (Fnc), for counting the number of times of a consecutive appearances of a normal polarity-reversal interval period (Tn0, Tn1, . . . ), in which a measured value, based on the count value Ntf, of an interval of the adjoining polarity-reversal timings (h0, h1, h2, . . . ) notified by the polarity reversal notification signal (So), is an upper limit Tsup of a polarity-reversal interval desirable for the discharge lamp (Ld), or less, wherein when the number of times of a consecutive appearances Np is counted, and the unusual polarity-reversal interval periods (Te, Te', . . . ), which is longer than the upper limit Tsup of the above-mentioned polarity-reversals interval appears, in a measured value, based on the count value Ntf, of an interval of adjoining polarity-reversals timings (h0, h1, h2, . . . ), an operation for memorizing the number of times of the maximum consecutive appearances Npm as a maximum value of the number of times of a consecutive appearances Np and resetting the number of times of consecutive appearances Np, is continued, so that after that, by receiving the polarity reversal notification signal (So) by which the number of times of consecutive appearances Np becomes equal to the number of times of maximum consecutive appearances Npm, a start of the unusual polarity-reversal interval period (Te, Te', . . . ) is recognized and appearance of the unusual polarity-reversal interval period (Te, Te', . . . ) is detected by prediction, whereby the additional polarity-reversal order signal (Sra) is given to the inverter polarity phase generation circuit (Ufp) before passage of the upper limit Tsup of the polarity-reversal interval from the start of the unusual polarity-reversals interval period (Te, Te', . . . ).

A discharge lamp lighting apparatus according to an aspect of a second embodiment of the present invention, comprises: an electric supply circuit (Ux) which causes a discharge lamp (Ld) to maintain electric discharge, and supplying predetermined electric power thereto, an inverter (Ui) for carrying out polarity reversals of output voltage of the electric supply circuit (Ux), to be applied to the discharge lamp (Ld), and an inverter control circuit (Uf) which receives a polarity reversal notification signal (So) to be inputted from the outside in order to give a notice of polarity-reversal timings (h0, h1, h2, . . . ) of this inverter (Ui), and generates an inverter polarity phase signal (Sf1, Sf2) for specifying a polar phase of the inverter (Ui). The inverter control circuit (Uf) has a polarity-reversal control circuit (Ufc) which manages a polarity-reversal operation of the inverter (Ui) based on the polarity reversal notification signal (So), and an inverter polarity phase generation circuit (Ufp) which generates the inverter polarity phase signal (Sf1, Sf2). The polarity-reversal control circuit (Ufc) gives a polarity-reversal order signal (Sr) to the inverter polarity phase generation circuit (Ufp), as a basic operation, every time the polarity-reversal control circuit (Ufc) recognizes the polarity-reversal timing (h0, h1, h2, . . . ), which is notified by the polarity reversal notification signal (So), so that the polarity of the inverter (Ui) may be inverted. The polarity-reversal control circuit (Ufc) has a period measurement elapsed-time counter (Ftc) which performs a count operation at every predetermined period of time, wherein when the polarity-reversal control circuit (Ufc) recognizes polarity-reversals timings (h0, h1, h2, . . . ), after memorizing a count value Ntf of the period measurement elapsed-time counter (Ftc), the polarity-reversal control circuit (Ufc) resets the count value Nt of the period measurement elapsed-time counter (Ftc), and resumes a count operation of the period measurement elapsed-time counter (Ftc), thereby measuring an interval of the polarity-reversals timings (h0, h1, h2, . . . ) which adjoins each other, based on the memorized count value Ntf. The polarity reversal notification signal (So) gives a notification about a possibility that a period after the polarity reversal, which starts from a notification of timing notified by the polarity reversal notification signal (So), with the polarity-reversal timing (h0, h1, h2, . . . ), becomes an unusual polarity-reversal interval period (Te, Te', . . . ), which is longer than the upper limit Tsup of a polarity-reversals interval desirable for the discharge lamp (Ld), is predicted, and the unusual polarity-reversal interval warning (Se) which indicates truth when a period during which there is the possibility, and false when a period during which there is not the possibility is predicted, is added thereto. The polarity-reversal control circuit (Ufc) receives the polarity reversal notification signal (So), determines whether the unusual polarity-reversal interval warning (Se) is true or false, confirms, based on the count value Ntf of the period measurement elapsed-time counter (Ftc), whether an after-polarity-reversal period after the possibility of the unusual polarity-reversal interval period (Te, Te', . . . ) is predicted by the unusual polarity-reversal interval warning (Se) which indicates truth, is actually the unusual polarity-reversals interval period (Te, Te', . . . ), continues an operation for memorizing the unusual polarity-reversal interval period appearance information (Sz) which indicates truth when the unusual polarity-reversal interval period (Te, Te', . . . ) is confirmed, and for memorizing the unusual polarity-reversal interval period appearance information (Sz) which indicates false when the unusual polarity-reversal interval period (Te, Te', . . . ) is not confirmed. When the unusual polarity-reversal interval period appearance information (Sz) is truth, and when the polarity-reversal control circuit (Ufc) receives the polarity reversal notification signal (So) to which the true unusual polarity-reversal interval warning (Se) is added, it is regarded as a start of the unusual polarity-reversal interval period (Te, Te', . . . ), so that appearance of the unusual polarity-reversal interval period (Te, Te', . . . ) is detected by prediction, at time when the after polarity reversal period starts, in which the possibility that the period becomes the unusual polarity-reversal interval period (Te, Te', . . . ) is predicted by the unusual polarity-reversal interval warning (Se). Thereby, the additional polarity-reversal order signal (Sra) is given to the inverter polarity phase generation circuit (Ufp) before passage of the upper limit Tsup of the polarity-reversal interval from the start of the unusual polarity-reversals interval period (Te, Te', ... ).

A discharge lamp lighting apparatus according to an aspect of a third embodiment of the present invention, wherein the unusual polarity-reversal interval warning (Se) is a binary signal which shows a high level or a low level in polar character and is outputted before the polarity-reversal timings (h0, h1, h2, ... ) as a predetermined polarity signal, and wherein the polarity-reversal control circuit (Ufc) receives the unusual polarity-reversal interval warning (Se) which is binary, and determines whether the unusual polarity-reversal interval warning is true or false.

A discharge lamp lighting apparatus according to a fourth invention in the present invention, wherein the polarity reversal notification signal (So) is notified by multi-bit numerical data, wherein the polarity-reversal timing information to which a true unusual polarity-reversal interval period (Te, Te', ... ) warning is attached, and the polarity-reversals timing information to which a fake unusual polarity-reversal interval period (Te, Te', ... ) warning is attached, are respectively defined by corresponding constant values, and wherein the polarity-reversal control circuit (Ufc) receives the multi-bit polarity reversal notification signal (So), judges whether the received numerical data is in agreement with any of the corresponding constant values, and acquires polarity-reversal timing information while recognizing the truth of the unusual polarity-reversal interval warning (Se), or false thereof.

In discharge lamp lighting apparatus according to an aspect of a fifth embodiment of the present invention, the polarity reversal notification signal (So) is a binary signal and also a pulse signal which shows a high level or a low level in polar character, and the polarity reversal notification signal (So) is inverted to one polarity before the polarity-reversal timing (h0, h1, h2, ... ), and gives a notification of the polarity-reversal timing (h0, h1, h2, ... ) at transition timing when the polarity reversal notification signal (So) returns to the other polarity, wherein the truth or false of the unusual polarity-reversal interval warning (Se) is expressed depending on whether the length of a period from reversal to the one polarity until returning to the other polarity, is longer or shorter than a predetermined duration, wherein the polarity-reversal control circuit (Ufc) receives the polarity reversal notification signal (So), which is binary, judges whether the length of a period from reversal to the one polarity until returning to the other polarity is longer or shorter than the predetermined duration, thereby recognizing the truth or false of the unusual polarity-reversal interval warning (Se), and acquires the polarity-reversal timing information at the transition timing at which the polarity reversal notification signal (So) returns to the other polarity.

In a discharge lamp lighting apparatus according to an aspect of a six embodiment of the present invention, the additional polarity-reversal order signal (Sra) is given timings which are obtained by approximately equally dividing the unusual polarity-reversal interval period (Te, Te', ... ).

In a discharge lamp lighting apparatus according to an aspect of a sixth embodiment of the present invention, when the number of times of the polarity-reversal order signal (Sr) in one cycle of a time series of issue of the polarity-reversal order signal (Sr) from the polarity-reversal control circuit (Ufc) including the additional polarity-reversal order signal (Sr), is even times, the inverter control circuit (Uf) inserts intermittently an operation so as not to give a series of odd number of times of the polarity-reversals trigger signal (Srp) to the inverter polarity phase generation circuit (Ufp).

In a discharge lamp lighting apparatus according to an aspect of an eighth embodiment of the present invention, the inverter control circuit (Uf) inserts an operation in which a series of even times part of the polarity-reversals trigger signal (Srp) is not given to the inverter polarity phase generation circuit (Ufp), between an operation in which a series of odd number of times part of the polarity-reversal trigger signal (Srp) is not given to the inverter polarity phase generation circuit (Ufp), and a next operation in which a series of odd number of times part of the polarity-reversals trigger signal (Srp) is not given to the inverter polarity phase generation circuit (Ufp).

A projector according to an aspect of a ninth embodiment of the present invention, comprises: a two-dimensional light amplitude modulation element (Dm) in which a large number of pixels capable of amplitude modulation with respect to emitted light is arranged in form of two-dimensional array, a two-dimensional light amplitude modulation element driving circuit (Um) for driving the two-dimensional light amplitude modulation element (Dm) according to an image signal, a discharge lamp (Ld) which is a light source for illuminating the two-dimensional light amplitude modulation element (Dm), the above described discharge lamp lighting apparatus (Uw) for lighting the discharge lamp (Ld), an illumination optical system (Ij) which converts light of the discharge lamp (Ld) into illumination light flux which illuminates the two-dimensional light amplitude modulation element (Dm), a projection optical system (Ej) including an image forming optical element for projecting and displaying an image of the two-dimensional light amplitude modulation element (Dm) on a screen (Tj). The discharge lamp lighting apparatus (Uw) is the above-described discharge lamp lighting apparatus, wherein while the two-dimensional light amplitude modulation element driving circuit (Um) controls an optical modulation operation of the pixels, and the polarity reversal notification signal (So) is generated, so as to be input into the discharge lamp lighting apparatus (Uw).

Although the time length of the interval of polarity reversal notification signals changes depending on situations, it is possible to offer a discharge lamp lighting apparatus and a projector in which the problem that an additional polarity reversal notification signal is not inserted at proper timing can be solved.

BRIEF DESCRIPTION OF THE DRAWING

Other features and advantages of the present discharge lamp lighting apparatus and projector will be apparent from the ensuing description, taken in conjunction with the accompanying drawings, in which:

FIG. 1 is a schematic block diagram of a discharge lamp lighting apparatus;

FIG. 2 is a pattern timing diagram of an operation of a discharge lamp lighting apparatus according to an embodiment of the present invention;

FIG. 7 is a schematic block diagram of part of a discharge lamp lighting apparatus according to an embodiment of the present invention;

FIG. 8 is a schematic block diagram of part of a discharge lamp lighting apparatus according to an embodiment of the present invention;

FIG. 9 is a schematic block diagram of a projector according to an embodiment of the present invention;

DESCRIPTION

Figure 3:
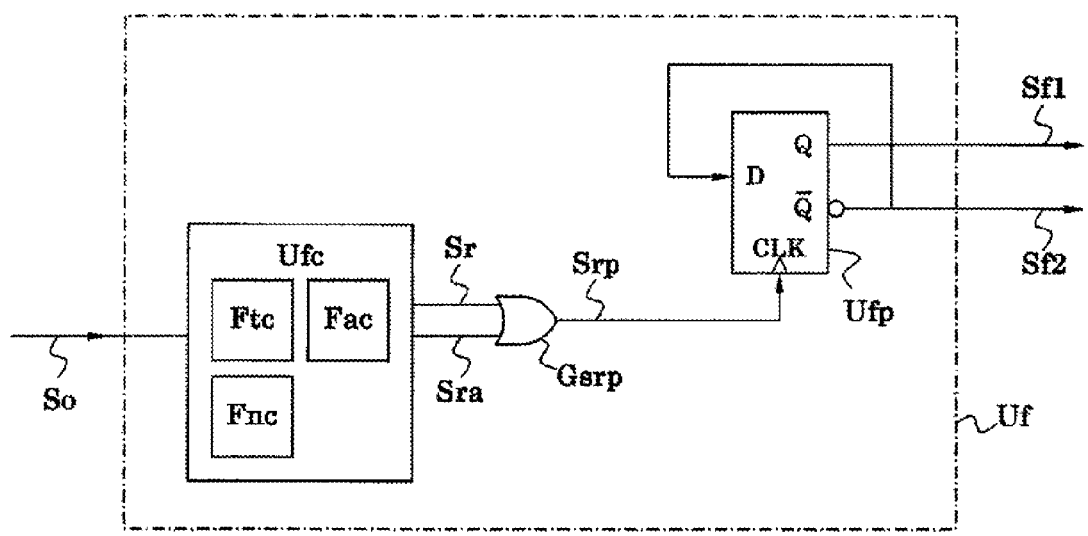
FIG. 3 is a schematic block diagram of part of a discharge lamp lighting apparatus according to an embodiment of the present invention.

Description of embodiments will be given below referring to FIGS. 1, 2, and 3. FIG. 1 is a schematic block diagram of a discharge lamp lighting apparatus. FIG. 2 is a pattern timing diagram of an operation of a discharge lamp lighting apparatus according to an embodiment of the present invention. FIG. 3 is a schematic block diagram of part of a discharge lamp lighting apparatus according to an embodiment of the present invention. An output from an electric supply circuit (Ux) for supplying electric power to a discharge lamp (Ld) is connected to electrodes (E1, E2) for a main discharge of the discharge lamp (Ld) through an inverter (Ui). The electric supply circuit (Ux) is configured with, for example, a step-down chopper circuit shown in FIG. 5, which will be described below, and the inverter (Ui) is configured with, for example, a full bridged circuit shown in FIG. 4, which will be described below.

A starter (Ut), which initiates electric discharge, is connected to the discharge lamp (Ld). It is possible to use, as the starter, a system in which a high voltage pulse generation circuit is in series connected to the electrodes (E1, E2) for the main discharge, so as to apply high-voltage pulse to the electrodes (E1, E2), a system in which high voltage generated by resonance is applied to the electrodes (E1, E2), and the so-called external trigger system in which high voltage is applied to an auxiliary electrode (Et) provided on an outer portion of a sealed body of the discharge lamp (Ld) can be used as the starter. A type of the starter is not related to the essence of the embodiment of the present invention.

The polarity reversal notification signal (So), which specifies polarity-reversal timing of the inverter (Ui) is inputted into an inverter control circuit (Uf) from the outside. In the inverter control circuit (Uf), inverter polarity phase signals (Sf1, Sf2), which specify a polarity-reversal operation of the inverter (Ui) based on this polarity reversal notification signal (So), are generated. As shown in FIG. 3, in the inverter control circuit (Uf), an inverter polarity phase generation circuit (Ufp) generates the inverter polarity phase signals (Sf1, Sf2). In this figure, the inverter polarity phase generation circuit (Ufp) is configured with a delay flip flop, in which each time the inverter polarity phase generation circuit (Ufp) receives a polarity-reversal trigger signal (Srp) inputted into a clock input terminal CLK thereof, the status of the inverter polarity phase signals (Sf1, Sf2), which are outputted from a delay output terminal Q and an inverting output terminal thereof, are reversed from a combination of low-high to a combination of high-low.

A polarity-reversal control circuit (Ufc) generates a polarity-reversal order signal (Sr) when it recognizes polarity-reversal timing (h0, h1, h2, . . . ) from the polarity reversal notification signal (So) as shown in FIG. 2, and gives the signal as the polarity-reversal trigger signal (Srp) to the inverter polarity phase generation circuit (Ufp), whereby, as described above, the status of the inverter polarity phase signals (Sf1, Sf2) are reversed. Moreover, the polarity-reversal control circuit (Ufc) has a period measurement elapsed-time counter (Ftc) which generates a pulse, every predetermined period, and counts the number of generated pulses. The polarity-reversal control circuit (Ufc) repeats an operation in which when polarity-reversal timing (h0, h1, h2, . . . ) is recognized, while a count value Ntf of the period measurement elapsed-time counter (Ftc) in that time is memorized, the count value Nt of the period measurement elapsed-time counter (Ftc) is reset thereby resuming a measurement operation for lapsed time. The count value Nt, which changes from time to time, indicates a value correlated with lapsed time from the last polarity-reversal timing, i.e., lapsed time. In addition, since the memorized counted-value Ntf correlates with lapsed time from one before the last polarity-reversal timing to the last polarity-reversal timing, this means that a time interval of adjoining polarity-reversal timings is measured.

Each time the polarity-reversal control circuit (Ufc) receives the polarity reversal notification signal (So) thereby determining the count value Ntf, the polarity-reversal control circuit (Ufc) monitors whether the determined count value Ntf is equal to or less than, or greater than a count value of the period measurement elapsed-time counter (Ftc), which corresponds to an upper limit Tsup of a polarity-reversal interval, which is desirable for the discharge lamp (Ld).

In the former case, it is determined that a normal polarity-reversal interval period is detected, so that the number of times of consecutive appearances Np of a consecutive appearance times counter (Fnc) for a normal polarity-reversal interval period, which is provided in the polarity-reversal control circuit (Ufc), is incremented. In the latter case, it is determined that an unusual polarity-reversal interval period is detected, an operation is repeated, in which while a value of the consecutive appearance times counter (Fnc) is memorized as the number of times of maximum consecutive appearances Npm, the consecutive appearance times counter (Fnc) is reset and a count operation of the normal polarity-reversal interval period is resumed. In addition, as described below, in the latter case, even after it is decided that the unusual polarity-reversal interval period is detected, the period measurement elapsed-time counter (Ftc) is operated until the end of the unusual polarity-reversal interval period, and the decided count value Ntf is memorized as the count value Ntfe of the unusual polarity-reversal interval period.

Each time the polarity-reversal control circuit (Ufc) receives the polarity reversal notification signal (So) so that the count value Ntf is determined, the polarity-reversal control circuit (Ufc) checks whether the value of the consecutive appearance times counter (Fnc) is equal to the number of times of maximum consecutive appearances Npm, which has been memorized therebefore. When it is equal to the number of times of maximum consecutive appearances Npm, since it can be presumed that the start timing of the unusual polarity-reversal interval period, which is found in the last cycle, has been caught, before the upper limit Tsup of the polarity-reversal interval passes with respect to this unusual polarity-reversal interval period, an additional polarity-reversal order signal (Sra) can be generated at timing at which the count value Nt of the period measurement elapsed-time counter (Ftc) turns into a suitable value. The additional polarity-reversal order signal (Sra) is combined with the polarity-reversal order signal (Sr) by an OR gate (Gsrp), so as to be given to the inverter polarity phase generation circuit (Ufp) as the polarity-reversal trigger signal (Srp).

As described above, in the discharge lamp lighting apparatus according to the embodiment of the present invention, even when the upper limit Tsup of the polarity-reversal interval is exceeded periodically in time length of the interval of the polarity reversal notification signal (So) inputted from the outside, before exceeding the upper limit Tsup of the polarity-reversal interval, it is possible to perform polarity reversal of the inverter (Ui) by prediction.

In the above-described embodiment of the present invention, when the number of times of maximum consecutive appearances Npm is undecided immediately after an operation of the discharge lamp lighting apparatus is initiated, or when it is immediately after the time length of a black screen period (Pb) or the number of the polarity reversal notification signals (So) contained in the effective screen period (Pw) changes due to a change of setting of a projector, although the additional polarity-reversal order signal (Sra) may not be properly generated. However, since it is possible to properly generate the additional polarity-reversal order signal (Sra) after passage of a first cycle, there is no practical problem.

Figure 4:
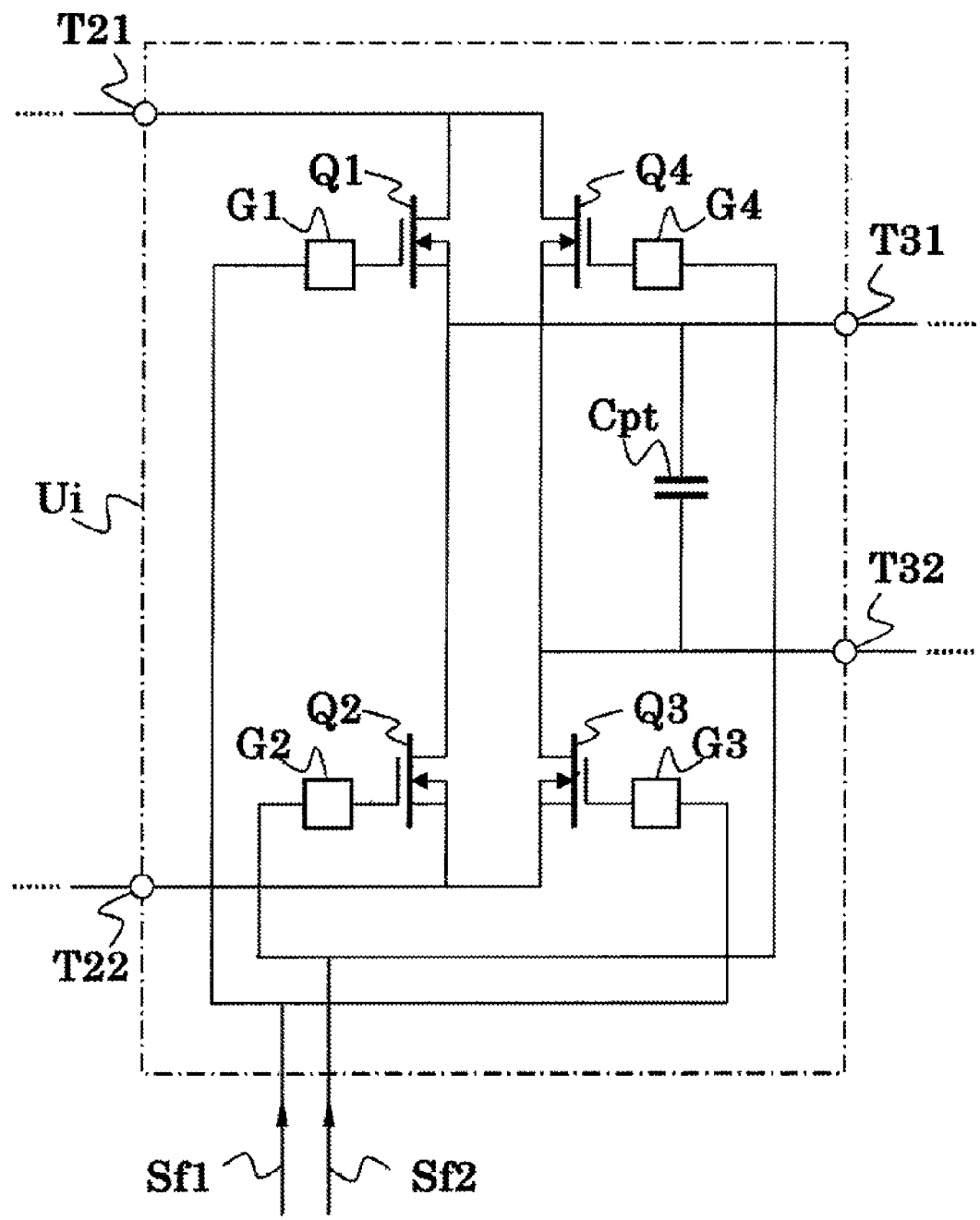
FIG. 4 is a schematic diagram of part of a discharge lamp lighting apparatus according to an embodiment of the present invention.

FIG. 4 is a schematic diagram of part of the discharge lamp lighting apparatus according to an embodiment of the present invention. The inverter (Ui) is configured with a full bridged circuit in which switch elements (Q1, Q2, Q3, Q4) such as FETs are used. Each switching element (Q1, Q2, Q3, and Q4) is driven by a gate driving circuit (G1, G2, G3, and G4), and the gate driving circuits (G1, G2, G3, and G4) are controlled according to an inverter control signals (Sf1, Sf2) generated by the inverter control circuit (Uf) so that when the switching element (Q1) and the switching element (Q3) which are in diagonal element relationship are in an ON state, the switching element (Q2) and the switching element (Q4), which are in diagonal element relationship, are maintained in an OFF state, and conversely, when the switching element (Q2) and the switching element (Q4), which are in diagonal element relationship, are in an ON state, the switching element (Q1) and the switching element (Q3), which are in diagonal element relationship, are in an OFF state.

When the two phases are switched, a period which is called a dead time in which all the switching elements (Q1, Q2, Q3, and Q4) are turned off, is preferably inserted. For this purpose, the gate drive circuits (G1, G2, G3, G4) can be easily realized by using a commercially available high-side driver IC, etc., having an insertion function of dead time.

In addition, in case where the switching elements (Q1, Q2, Q3, and Q4) are MOSFETs, a parasitism diode whose forward direction is from a source terminal toward a drain terminal is built in each element itself (not shown), but when an element such as a bipolar transistor etc. in which a parasitism diode does not exist, is used therefor, since there is a possibility that induced current resulting from the inductance component which exists in the downstream side of the inverter (Ui) flows so that the element may be damaged since reverse voltage is generated at the above-mentioned switching time or during the dead time, it is desirable to connect a diode equivalent to a parasitism diode in reverse-parallel. In addition, it is good to provide a capacitor (Cpt) to protect the switch elements (Q1, Q2, Q3, Q4) from surge voltage etc.

Figure 5:
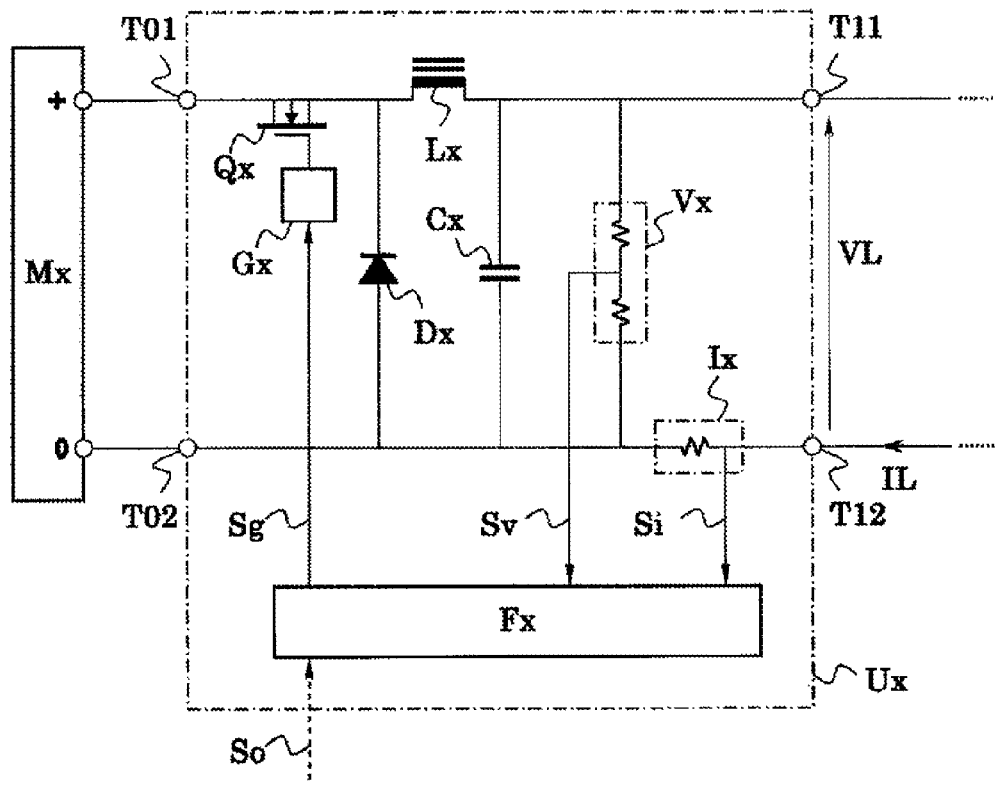
FIG. 5 is a schematic diagram of part of a discharge lamp lighting apparatus according to an embodiment of the present invention.

FIG. 5 shows an example of an electric supply circuit (Ux) which can be used in a discharge lamp lighting apparatus according to an embodiment of the present invention. The electric supply circuit (Ux) based on a step-down chopper circuit is operated by receiving supply of voltage from a DC power supply (Mx), such as a PFC, and performs adjustment of the amount of electric supply to the discharge lamp (Ld). The electric supply circuit (Ux) is configured so that current from the DC power source (Mx) is turned on and off by a switching element (Qx) such as an FET, so that a smoothing capacitor (Cx) is charged through a choke coil (Lx), and this voltage is applied to the discharge lamp (Ld), thereby passing current through the discharge lamp (Ld).

In addition, in a period when the switching element (Qx) is in an ON state, the smoothing capacitor (Cx) is directly charged and current is supplied to the discharge lamp (Ld) which is a load, by the current which flows through the switching element (Qx), whereby energy is stored in a choke coil (Lx) in the form of magnetic flux. In a period when the switching element (Qx) is in an OFF state, current is supplied to the discharge lamp (Ld) through a fly wheel diode (Dx), by electric discharge from the smoothing capacitor (Cx) and the energy stored in the choke coil (Lx) in the form of magnetic flux.

In the step down chopper type electric supply circuit (Ux), the amount of electric power to the discharge lamp can be adjusted by a ratio of a period of an ON state of the switching element (Qx) to an operation cycle of the switching element (Qx), that is, a duty cycle ratio. Here, a gate driving signal (Sg), which has a certain duty cycle ratio, is generated by an electric supply control circuit (Fx), and turning on and off of the current from the DC power source (Mx) is controlled by controlling a gate terminal of the switching element (Qx) through a gate driving circuit (Gx).

Lamp current (absolute value) which flows between the electrodes (E1, E2) of the discharge lamp (Ld), and lamp voltage (absolute value) generated between the electrodes (E1, E2) are detected by an electric supply current detection unit (Ix) and an electric supply voltage detection unit (Vx), respectively. In addition, the electric supply current detection unit (Ix) can be easily realized by using a shunt resistor, and the electric supply voltage detection unit (Vx) can be easily realized by using a voltage dividing resistor.

An electric supply current detection signal (Si) from the electric supply current detection unit (Ix) and an electric supply voltage detection signal (Sv) from the electric supply voltage detection unit (Vx) are respectively inputted into the electric supply control circuit (Fx). In the period when lamp current does not flow at start-up time of the lamp, the electric supply control circuit (Fx) generates the gate driving signal (Sg) in a feedback manner so as to output a certain voltage in order to apply non-load open circuit voltage to the lamp. Moreover, when a lighting operation of the lamp is initiated so that discharge current flows, the electric supply control circuit (Fx) generates the gate driving signal (Sg) in a feedback manner so that target lamp current may be outputted.

The target lamp current is based on a value by which electric power applied to the discharge lamp (Ld) turns into predetermined electric power, depending on voltage of the discharge lamp (Ld). However, since the voltage of the discharge lamp (Ld) is low immediately after the start-up thereof so that rated power cannot be supplied, the target lamp current is controlled so as not to exceed a constant limit value, which is called initial limit current. The voltage of the discharge lamp (Ld) rises with a temperature rise, and if current required for predetermined electric power impression turns into the above-mentioned initial limit current or less, it smoothly shifts to a state where the predetermined electric power impression can be realized.

Although in the above description, a step-down chopper circuit is shown as an electric supply circuit (Ux), as long as it is, for example, a converter such as a boost chopper circuit etc. which converts input electric power into voltage and current suitable for supplying electric power to the discharge lamp, the form of an electric supply circuit is unrelated to the essence of the present invention.

Figure 6:
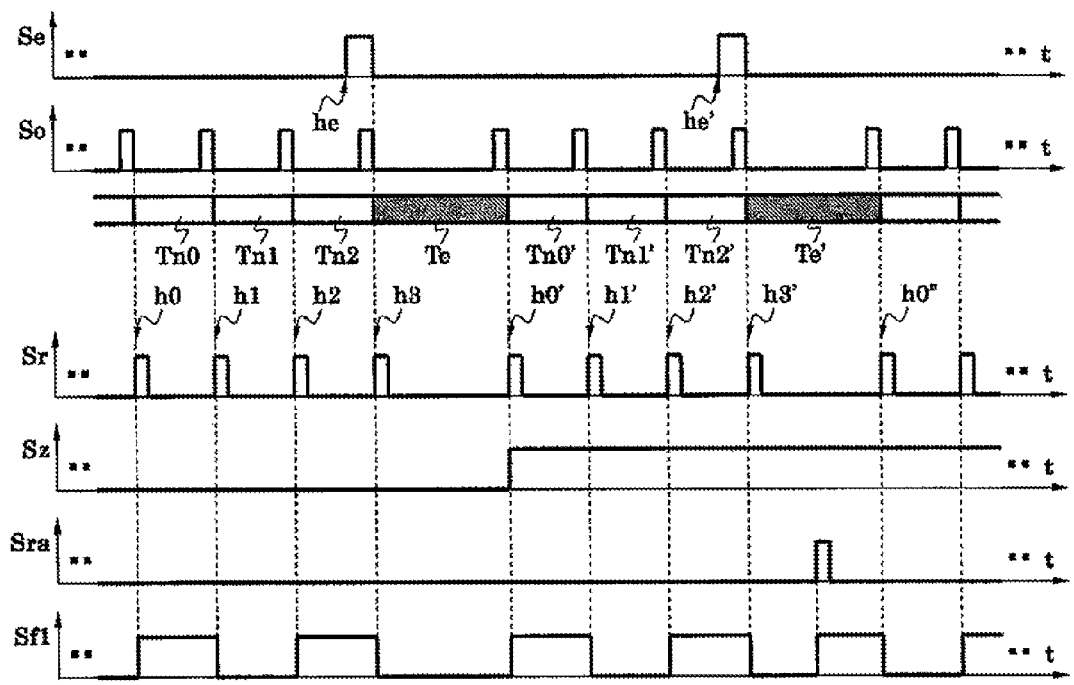
FIG. 6 is a schematic timing diagram of an operation of a discharge lamp lighting apparatus according to an embodiment of the present invention.

Next, description of an embodiment of the present invention will be given below referring to FIGS. 6 and 7. FIGS. 6 and 7 are schematic timing diagrams of an operation of a discharge lamp lighting apparatus according to an embodiment of the present invention.

In the configuration described above referring to FIGS. 2 and 3, it is assumed that only information on the polarity-reversal timing is included in the polarity reversal notification signal (So), and the polarity-reversal control circuit (Ufc) is configured so as have a function for finding an unusual polarity-reversal interval period.

However, as explained above referring to FIG. 12, the unusual polarity-reversal interval period is generated in association with a black screen insertion etc. under control of the two-dimensional light amplitude modulation element driving circuit of an actual projector. Therefore, when the polarity reversal notification signal (So) is generated, the two-dimensional light amplitude modulation element driving circuit has information as to whether a period after the polarity reversal starts from the polarity reversal notification signal (So) is a period where it is possible to turn into an unusual polarity-reversal interval period, that is, a period for a black screen insertion etc. or a normal period which is not the above-mentioned period. From such a viewpoint, in the configuration shown in FIGS. 6 and 7, it is assumed that information on truth or false of a possibility that a period after polarity reversal starting from a polarity reversal notification signal (So) turns into an unusual polarity-reversal interval period, is added to the polarity reversal notification signal (So) as an unusual polarity-reversal interval warning (Se) (as part of the above-mentioned polarity reversal notification signal (So)), and it is, as an example, notified to the discharge lamp lighting apparatus just before the polarity-reversal timing (h0, h1, h2, . . . ).

When the polarity-reversal control circuit (Ufc) detects that the unusual polarity-reversal interval warning (Se) in the polarity reversal notification signal (So) is true, and determine whether the period after the started polarity reversal has actually been the unusual polarity-reversal interval period (Te, Te', . . . ), by monitoring whether the count value Ntf is equal to or less than the counted value of the period measurement elapsed-time counter (Ftc), or is greater than the count value of the period measurement elapsed-time counter (Ftc). And the result, i.e., the unusual polarity-reversal interval period appearance information (Sz) which is truth or false, is generated and memorized as shown in FIG. 6. In addition, in the latter case, as described later, it is good to operate the period measurement elapsed-time counter (Ftc) until the end of the unusual polarity-reversal interval period even after the unusual polarity-reversal interval period detection is decided and fixed, and to memorize the decided count value Ntf as unusual polarity-reversal interval period count value Ntfe.

When the true unusual polarity-reversal interval period appearance information (Sz) is memorized in the last cycle, if the polarity reversal notification signal (So) to which the true unusual polarity-reversal interval warning (Se) is added is received in this cycle, since it is possible to presume that the start timing of the unusual polarity-reversal interval period is caught, with respect to this unusual polarity-reversal interval period, an additional polarity-reversal order signal (Sra) is generated at timing when the count value Nt of the period measurement elapsed-time counter (Ftc) turns into a suitable value, before passage of the upper limit Tsup of the polarity-reversal interval.

In FIG. 6, the simplest example is described and explained, wherein it is determined that a true unusual polarity-reversal interval warning (Se) generated at timing (he, he') predicts a possibility that a period after polarity reversal started from the polarity-reversal timing (h3, h3') which is notified immediately after the true unusual polarity-reversal interval warning (Se) is generated, turns into a unusual polarity-reversal interval period (Te, Te', . . . ). However, according to the embodiments of the present invention, there is no need to limit the period after the polarity reversal, which has the possibility of turning into the unusual polarity-reversal interval period (Te, Te', . . . ), to a period immediately after the unusual polarity-reversal interval warning (Se). This operation may be generalized, so that a delayed polarity-reversal timing number Nd is determined as the specification of a discharge lamp lighting apparatus, whereby a true unusual polarity-reversal interval warning (Se) predicts a possibility that a period after polarity reversal, which starts from polarity-reversal timing notified at the Nd-th time therefrom, turns into a unusual polarity-reversal interval period (Te, Te', . . . ). And according to the determined specification, the polarity reversal notification signal (So) to which the unusual polarity-reversal interval warning (Se) has been added may be inputted into the discharge lamp lighting apparatus from the two-dimensional light amplitude modulation element driving circuit of the projector.

In case where the delayed polarity-reversal timing number Nd is larger than one (1), the inverter control circuit (Uf) may be configured so that an after-unusual-warning polarity-reversal number counter is provided in the polarity-reversal control circuit (Ufc), wherein when the true unusual polarity-reversal interval warning (Se) is recognized, the polarity-reversal control circuit (Ufc) sets "Nd" to the after-unusual-warning polarity-reversal number counter, and after that, a value of the after-unusual-warning polarity-reversal number counter is decremented each time the polarity-reversal timing (h0, h1, h2, . . . ) of the polarity reversal notification signal (So) is recognized, and when it detects that the after-unusual-warning polarity-reversal number counter became zero (0), the polarity-reversal control circuit (Ufc) regards it as a start of the period after polarity reversal which has possibility of turning into a unusual polarity-reversal interval period (Te, Te', . . . ).

In addition, in the examples shown in FIGS. 6 and 7, although the unusual polarity-reversal interval warning (Se) and the polarity reversal notification signal (So) are respectively binary signals each of which shows a high level or a low level in polar character, the embodiments of the present invention is not limited to this form of signals but any form of signals may be used as long as required information can be transmitted to the inverter control circuit (Uf).

For example, the polarity-reversal timing information to which the true unusual polarity-reversal interval warning is attached, and the polarity-reversal timing information to which the false unusual polarity-reversal interval warning is attached, are defined by respectively assigning constant values or, for example, characters or character strings according to ASCII code etc., which correspond thereto respectively, and the polarity reversal notification signal (So) may be notified by multiple-bit data, i.e., a command. At this time, in the discharge lamp lighting apparatus according to the embodiment of the present invention, the polarity-reversal control circuit (Ufc) receives the polarity reversal notification signal (So) as a command, and judges whether the received numerical data is in agreement with any one of the corresponding constant values, whereby it is possible to recognize the truth or false of the unusual polarity-reversal interval warning (Se) and also to obtain the polarity-reversal timing information.

Further, the polarity reversal notification signal (So) may be a binary pulse signal, which is inverted to one polarity (for example, high level) in advance of the polarity-reversal timing (h0, h1, h2, . . . ), and notifies the polarity-reversal timing (h0, h1, h2, . . . ), at transition timing at which it returns to the other polarity (for example, low level), and also, the polarity reversal notification signal (So) may express the truth or false of the unusual polarity-reversal interval warning (Se) depending on whether the length of a period after it is inverted to one polarity until it returns to the other polarity, is longer or shorter than a predetermined duration. In this case, in the discharge lamp lighting apparatus according to the embodiment of the present invention, the polarity-reversal control circuit (Ufc) receives the polarity reversal notification signal (So) as a binary pulse signal, and judges whether the length of a period after it is reversed to one polarity until it returns to the other polarity, is longer or shorter than the predetermined duration, whereby the truth or false of the unusual polarity-reversal interval warning (Se) can be recognized. In parallel therewith, the polarity-reversal timing information can be obtained from the transition timing at which it returns to the other polarity.

In the discharge lamp lighting apparatus according to the embodiment of the present invention, a start of the unusual polarity-reversal interval period (Te, Te', . . . ) generated from now on can be recognized by prediction, and further time length thereof can be known from the unusual polarity-reversal interval period (Te, Te', . . . ) which appears in one cycle before the cycle including the unusual polarity-reversal interval period. As described above, this can be realized by operating the period measurement elapsed-time counter (Ftc) until the end of the unusual polarity-reversal interval period, even after detection of the unusual polarity-reversal interval period is determined and fixed, and memorizing the determined count value Ntf as unusual polarity-reversal interval period count value Ntfe.

It is possible to determine in advance how many additional polarity-reversal order signals (Sra) should be inserted within the unusual polarity-reversal interval period generated from now on by dividing the unusual polarity-reversal-interval-period count value Ntfe by the count value corresponding to the upper limit Tsup of the polarity-reversal interval, which is desirable for the discharge lamp (Ld). Moreover, it is possible to determine the time length of the polarity-reversal interval or the count value Ndiv corresponding thereto in case where the additional polarity-reversal order signal (Sra) is inserted at timing where the unusual polarity-reversal interval period (Te, Te', . . . ) is equally divided.

The polarity-reversal control circuit (Ufc) has an insert interval lapsed-time counter (Fac), and starts a count operation of the insert interval lapsed-time counter (Fac) from a start of an unusual polarity-reversal interval period. When the count value reaches the count value Ndiv, while the additional polarity-reversal order signal (Sra) is given to the inverter polarity phase generation circuit (Ufp), the insert interval lapsed-time counter (Fac) is reset, and a count operation is resumed. Such an operation is repeated until the end of an unusual polarity-reversal interval period. In such configuration, it is possible to realize polarity reversal of the inverter (Ui), within an unusual polarity-reversal interval period (Te, Te' . . . ), at an approximately equal interval which does not exceed the upper limit Tsup of the polarity-reversal interval desirable for the discharge lamp (Ld).

As described above, in a projector into which the discharge lamp lighting apparatus and the discharge lamp (Ld) according to the embodiments of the present invention are built, it is expected that the time length of period from polarity reversal to the following polarity reversal is changed in association with a black screen insertion etc. When the number of times of the polarity reversals in an operation of one cycle is even times as described in the Japanese Patent Application No. 2008-146837, there is a problem that unbalanced heat load may be generated in two electrodes (E1, E2) of the discharge lamp (Ld).

In order to avoid this problem, as shown in FIG. 8, in the inverter control circuit (Uf), provided is an inverter polarity-reversal monitoring circuit (Ufm), which monitors the number of times of issuance of the polarity-reversal order signal (Sip) in one cycle of a time series of the polarity-reversal order signal (Srp) including the polarity-reversal order signal (Sra), which is additional. This inverter polarity-reversal monitoring circuit (Ufm) continuously counts the number of times of the polarity-reversal trigger signal (Srp) using the counter, and when the counted value is even time, the inverter polarity-reversal monitoring circuit (Ufm) inserts, every predetermined period, an operation in which a series of odd number of times part of the polarity-reversal trigger signal (Srp) is not given to the inverter polarity phase generation circuit (Ufp).

In such a way, even if the number of times of the polarity reversals in an operation of one cycle is even time, since the cycle whose number of times of polarity reversals is an odd number is intermittently inserted, the unbalanced heat load is canceled in the two electrodes (E1, E2) of the discharge lamp (Ld).

Moreover, as described in Japanese Patent Application Publication No. 2008-146837, the inverter polarity-reversal monitoring circuit (Ufm) may insert an operation in which a series of even number of times part of the polarity-reversal trigger signal (Srp) is not given to the inverter polarity phase generation circuit (Ufp), between an operation in which a series of odd number of times part of the polarity-reversal trigger signal (Srp) to be inserted is not given to the inverter polarity phase generation circuit (Ufp), and the next operation in which a series of odd number of times part of the polarity-reversal trigger signal (Srp) to be inserted is not given to the inverter polarity phase generation circuit (Ufp).

Thereby, the technologies in which one cycle of low frequency is inserted as described in Japanese Patent Application Publication No. 2006—No. 059790 (FIG. 4 of Japanese Patent Application Publication No. 2006-059790) or a half cycle is inserted (FIG. 6(a) of Japanese Patent Application Publication No. 2006-059790) can be applied thereto. As a result, the features of the technology, capable of fully controlling growth and wear-out of projections at tips of the two electrodes (E1, E2) of the discharge lamp (Ld), can be realized in the discharge lamp lighting apparatus according to the embodiment of the present invention.

FIG. 9 is a schematic block diagram showing a projector according to an embodiment of the present invention. Light flux (Ox1) emitted from a discharge lamp (Ld) which is lighted by a discharge lamp lighting apparatus (Uw) according to the embodiment of the present invention, is converted into color sequential light flux (Ox2) by an illumination optical system (Ij), which is made up of a concave mirror, a condensing lens, etc. (provided if needed), and a light uniformizing unit such as an optical guide and a flyeye integrator etc., so as to illuminate a two-dimensional light amplitude modulation element (Dm) which is configured by using a DMD (TM), LCD, LCOS, etc., and then amplitude modulation is carried out to form image light flux (Ox3) by a two-dimensional light amplitude modulation element (Dm), and after that projection light flux (Ox4) is projected towards a screen (Tj) formed in the exterior of the projector, or integratedly formed with the projector by a projection optical system (Ej).

While the two-dimensional light amplitude modulation element driving circuit (Um) drives the two-dimensional light amplitude modulation element (Dm) according to an image signal, the two-dimensional light amplitude modulation element driving circuit (Um) adds an unusual polarity-reversal interval warning (Se), if needed, to the polarity reversal notification signal (So) for notifying polarity-reversal timing and sends it to the discharge lamp lighting apparatus (Uw). In addition, although not explained explicitly above, when it is necessary to notify start timing of one cycle of periodic signal processing, which is carried out by the two-dimensional light amplitude modulation element driving circuit (Um), to the discharge lamp lighting apparatus (Uw), especially a signal therefor may be generated, and added to the polarity reversal notification signal (So), so as to be sent to the discharge lamp lighting apparatus (Uw), or the unusual polarity-reversal interval warning (Se) may serves as a substitution thereof. In addition, the discharge lamp lighting apparatus (Uw) may recognize it from the polarity-reversals timing pattern of the polarity reversal notification signal (So).

Figure 12A:
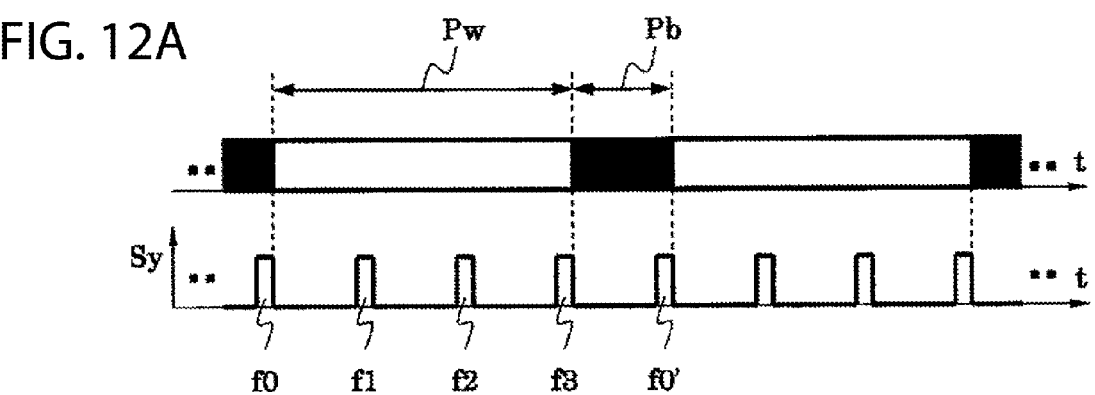
FIGS. 12A and 12B are pattern timing diagrams of an operation of a discharge lamp lighting apparatus according to an embodiment of the present invention.
Figure 12B:
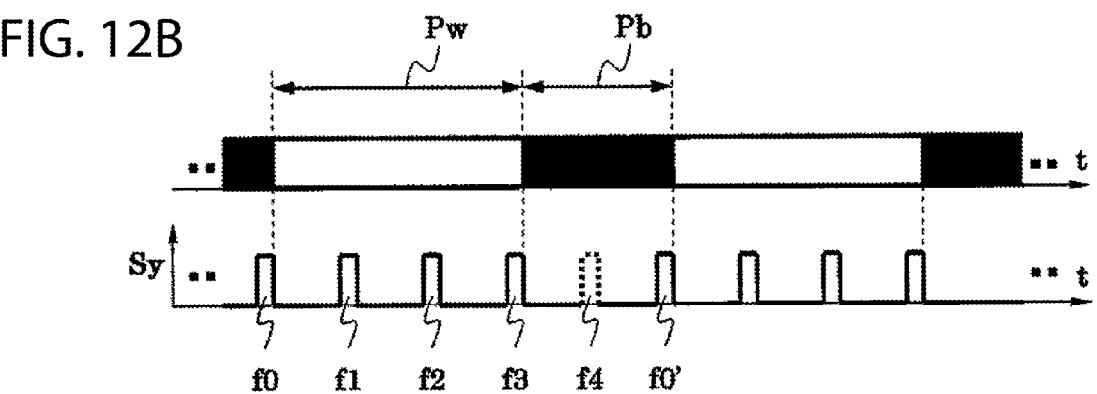

The above explanation with regard to FIG. 12 will be supplemented a little below. A reference is made to the problem that an interval of the polarity reversal notification signal (Sy) generated at timings (f3, f0') corresponding to start and end of the black screen period (Pb) becomes longer as shown in FIGS. 12A and 12B (from the interval shown in FIG. 12A to that shown in FIG. 12B). On the other hands, although intervals in the polarity reversal notification signal (Sy) generated at the timings (f1, f2) become short therebefore and thereafter, as shown in FIGS. 12A and 12B (from the interval shown in FIG. 12A to that shown in FIG. 12B), the problem with respect to it, has not been explained above.

The reason will be described below. Although, due to change from FIG. 12A to FIG. 12B or a reverse change thereof, the effective screen period (Pw) is shortened by only the same quantity as an increased part of the black screen period (Pb), since the effective screen period (Pw) is sufficiently longer than the black screen period (Pb) from the beginning, so that a ratio of reduction of the effective screen period (Pw) accompanying the change is small, a ratio of reduction of the interval of the polarity reversal notification signal (Sy) included in the effective screen period (Pw) is also small. Therefore, there is no need to worry about generation of big mismatching with respect to the upper limit Tsup and the lower limit Tinf of a polarity-reversal interval accompanying the change.

However, when small mismatching of the upper limit Tsup and the lower limit Tinf of the polarity-reversal interval also needs to be avoided, it is necessary to devise the configuration of a projector including a two-dimensional light amplitude modulation element driving circuit (Um). In such case, for example, it is good to consider a projector set forth below.

A projector comprises a two-dimensional light amplitude modulation element (Dm) in which a large number of pixels capable of amplitude modulation with respect to emitted light is arranged in form of two-dimensional array, a two-dimensional light amplitude modulation element driving circuit (Um) for driving the two-dimensional light amplitude modulation element (Dm) according to an image signal, a discharge lamp (Ld) which is a light source for illuminating the two-dimensional light amplitude modulation element (Dm), a discharge lamp lighting apparatus (Uw) for lighting the discharge lamp (Ld), an illumination optical system (Ij) which converts light of the discharge lamp (Ld) into illumination light flux which illuminates the two-dimensional light amplitude modulation element (Dm), a projection optical system (Ej) including an image forming optical element for projecting and displaying an image of the two-dimensional light amplitude modulation element (Dm) on a screen (Tj). The discharge lamp lighting apparatus (Uw) has an inverter (Ui) which carries out polarity reversal of voltage applied to the discharge lamp (Ld). While the two-dimensional light amplitude modulation element driving circuit (Um) generates a polarity reversal notification signal (So) in order to notify the polarity-reversal timing (h0, h1, h2, . . . ) of the inverter (Ui) to the discharge lamp lighting apparatus (Uw), two or more kinds of virtual time lengths correspond to time lengths of amplitude modulation periods corresponding to periods in each of which a predetermined modulation status of validation or invalidation of light in a pixel is maintained, are defined in the two-dimensional light amplitude modulation element driving circuit (Um). The two-dimensional light amplitude modulation element driving circuit (Um) drives the two-dimensional light amplitude modulation element (Dm) so that gradation of the brightness of each pixel may be expressed, by generating an amplitude modulation period which has virtual time length of each kind, in a time series manner. In the two-dimensional light amplitude modulation element driving circuit (Um), from the longest one of the two or more kinds of virtual time lengths of amplitude modulation periods, which have been defined, a required number of kinds thereof is in advance chosen in that order. When a time series of amplitude modulation period, which has the virtual time length of each kind, is generated, an order thereof at time when time series of amplitude modulation periods each of which has the virtual time length of each kind is generated, is determined so that in all the pixels, the polarity-reversal timing (h0, h1, h2, . . . ) may occur only within the pre-selected amplitude modulation period.

Further, in the above-mentioned projector, two or more time series of the amplitude modulation periods, each period having a virtual time length of each kind, are prepared, and a time series of the amplitude modulation period is selected from the prepared two or more kinds thereof, according to the actual time length to be related when a virtual time length obtained by a sum of time series of the amplitude modulation period each of which has a virtual time length of each kind, is related to the actual time length.

In the projector, modulation of validation or invalidation of light for each pixel of the two-dimensional light amplitude modulation element (Dm) is performed. Here, the above mentioned "validation or invalidation" of light means a broader concept of case where, for example, when the two-dimensional light amplitude modulation element (Dm) is a DMD (TM), light is modulated so as to be directed in a direction where the light enters a projection optical system (Ej) or in a direction where the light does not enter a projection optical system (Ej), and case where when the two-dimensional light amplitude modulation element (Dm) is an LCOS (TM) or an LCD, a polarization direction of light is rotated 90 degrees, or it is modulated so as not to be rotated and reflected or pass therethrough. The terms are synonymous with "ON or OFF" of light.

Although in the two-dimensional light amplitude modulation element driving circuit (Um), the light and darkness of each pixel is realized by the time length of either of the predetermined modulation statuses, that is, validation or invalidation. Namely, the light and darkness thereof can be expressed by a ratio of a validation period to the entire period, that is, a duty ratio. However, the validation or invalidation period is not continuous. When a period during which a fixed modulation status of validation or invalidation is maintained is called an amplitude modulation period, the length of this amplitude modulation period is defined by the virtual time length corresponding to the time length. The amplitude modulation period is defined with two or more kinds thereof in advance, and the above-described duty ratio is realized by the sum total of each length of the amplitude modulation period which is validated and modulated. The reason why the length of the amplitude modulation period of each kind is defined by virtual time length but not directly defined by time, is that an effective screen period (Pw) is extended and shortened, for example, by a change from FIG. 12A to FIG. 12B or a reverse change from FIG. 12B to FIG. 12A. In addition, the extension and shortening thereof is solved by a scaling, which is described later.

The kinds of the amplitude modulation period may be defined as set forth below. If one unit of virtual time length is defined by the shortest one thereof, for example, two units, four units, eight units, 16 units, can be created as the kinds, according to the theory of a DA conversion. The two-dimensional light amplitude modulation element driving circuit (Um) usually generates each kind of the defined amplitude modulation period during one effective screen period (Pw), once in a time series manner. This generation in a time serial manner is performed in general all at once for all the pixels. In addition, the order of the generation in a time series manner is not in order of longest or shortest ones and will be described below. Which one of amplitude modulation periods generated in a time series manner and having various lengths is validated, and which ones are invalidated, is selected for each pixel according to the brightness of the pixel.

From the longest one among these kinds of the amplitude modulation periods, the suitable number thereof is selected in order, and a set of the selected amplitude modulation periods is called a long amplitude modulation period class. When the two-dimensional light amplitude modulation element driving circuit (Um) generates the amplitude modulation period of each kind in a time series manner, an order at time of generating the amplitude modulation period of each kind in a time series manner is determined, so that the polarity-reversal timing (h0, h1, h2, . . . ) of the inverter (Ui) may be fit in the amplitude modulation period belonging to the long amplitude modulation period class. This determination may be made in advance and may be programmed as part of action of the two-dimensional light amplitude modulation element driving circuit (Um). Or, after the time length of an effective screen period (Pw) is decided, it is possible to decide it dynamically. However, before the time series of the amplitude modulation period is generated, the ratio of scaling from the virtual time length to actual time is decided so that the sum total of the virtual time lengths of the time series of the amplitude modulation period of all the kinds may correspond to an effective screen period (Pw).

Here, how to determine the scaling ratio will be briefly supplemented below. When ten (10) kinds of amplitude modulation periods are defined, for example, one unit of the virtual time length, 2 units thereof, 4 units thereof, . . . , 512 units thereof, the sum total of these virtual time lengths is 1023 units. For example, supposing the time length of the effective screen period (Pw) at time of a projector operation is 12.5 ms, by dividing it by the sum total of the virtual time length, it turns out that what is necessary is just to carry out scaling of one unit of the virtual time length to 12.2 microseconds, that is, a scaling ratio is decided as 12.2 µs/unit.

Moreover, implementation of the scaling and image processing will be briefly supplemented below. As to realization of the scaling, the two-dimensional light amplitude modulation element driving circuit (Um) has a virtual time length temporality counter (Fqc) wherein a cycle of timer interruption is set as 12.2 microseconds according to the scaling ratio. For example, supposing that the order of the time series of the programmed amplitude modulation period is 8, 32, 128, 2, 64, and . . . (the notation "unit" is omitted), before start of an effective screen period (Pw), the two-dimensional light amplitude modulation element driving circuit (Um) sets a first value 8 of the order of the time series of the amplitude modulation period to the virtual time length temporality counter (Fqc), and while it starts a timer operation with the start of the effective screen period (Pw), a predetermined modulation status of validation or invalidation of the first light in each pixel is generated.

If the virtual time length temporality counter (Fqc) is configured so as to decrement the value thereof when timer interruption occurs, since the value of the virtual time length temporality counter (Fqc) becomes zero by the eighth interruption, the two-dimensional light amplitude modulation element driving circuit (Um) detects this, thereby regarding it as the end of the process with respect to the first value, sets a second value 32 of the order of the time series of the amplitude modulation period to the virtual time length temporality counter (Fqc) thereby restarting a timer operation, and a fixed modulation status of validation or invalidation of the second light in each pixel is generated. The two-dimensional light amplitude modulation element driving circuit (Um) repeats such an operation until the end of the effective screen period (Pw), so that scaling and image processing of one effective screen period (Pw) are completed.

As described above, instantaneous turning-off, overshooting etc. of light emission at time of polarity reversal, arise, thereby causing a bad influence on a display image. The reason why the polarity-reversal timing (h0, h1, h2, . . . ) of the inverter (Ui) is made to be fit within the amplitude modulation period belonging to the long amplitude modulation period class, is that since the integrated light quantity of a short amplitude modulation period is small, if the polarity-reversal timing of the inverter (Ui) occurs within the short amplitude modulation period, disturbance in brightness due to instantaneous turning-off, overshooting etc. of light emission at time of polarity reversal, causes deviation of gradation expression, thereby causing a problem that a striped video image noise may be viewed. On the contrary, even if the polarity-reversal timing of the inverter (Ui) occurs in the amplitude modulation period belonging to a long amplitude modulation period class, since the integrated light quantity of the amplitude modulation periods is large, disturbance in brightness due to instantaneous turning-off, overshooting etc. of light emission at time of polarity reversal, etc. will become small relatively, so that the influence on gradation expression may be small.

In case where the two-dimensional light amplitude modulation element driving circuit (Um) generates the amplitude modulation period of each kind in a time series manner, when a configuration is dynamically made so that after the time length of an effective screen period (Pw) is decided, an order at the time of generating the amplitude modulation period of each kind in a time series manner is determined so that the polarity-reversal timing (h0, h1, h2, . . . ) of an inverter (Ui) is fit in the amplitude modulation period belonging to the long amplitude modulation period class, the above-described mismatching of the upper limit Tsup and the lower limit Tinf of the polarity-reversal interval does not occur since determination is made each time so that conditions are satisfied.

If it is programed in advance as part of an operation of the two-dimensional light amplitude modulation element driving circuit (Um), the small mismatching of the upper limit Tsup and the lower limit Tinf of the polarity-reversal interval may occur when scaling from the virtual time length to the actual time. In order to avoid this problem, two or more kinds of scaling ratios are suitably chosen from all the kinds of the scaling ratios or a range thereof which may occur. And further an order of the time series of the amplitude modulation period which corresponds to each scaling ratio and does not have mismatching of the upper limit Tsup and the lower limit Tinf of the polarity-reversal interval, wherein the polarity-reversal timing (h0, h1, h2, . . . ) of an inverter (Ui) is fit in the amplitude modulation period belonging to the long amplitude modulation period class, is decided in advance. What is necessary is to choose and apply the suitable one from the orders of the time series of the fixed amplitude modulation periods, which have been determined in advance, in response to a value of the actually generated scaling ratio at the time of projector operation.

In addition, the terms "according to the actual time length to be related when a virtual time length which is obtained by summing up time series of the amplitude modulation periods each of which has a virtual time length of each kind, is related to the actual time length" is synonymous with "according to a scaling ratio."

Figure 10:
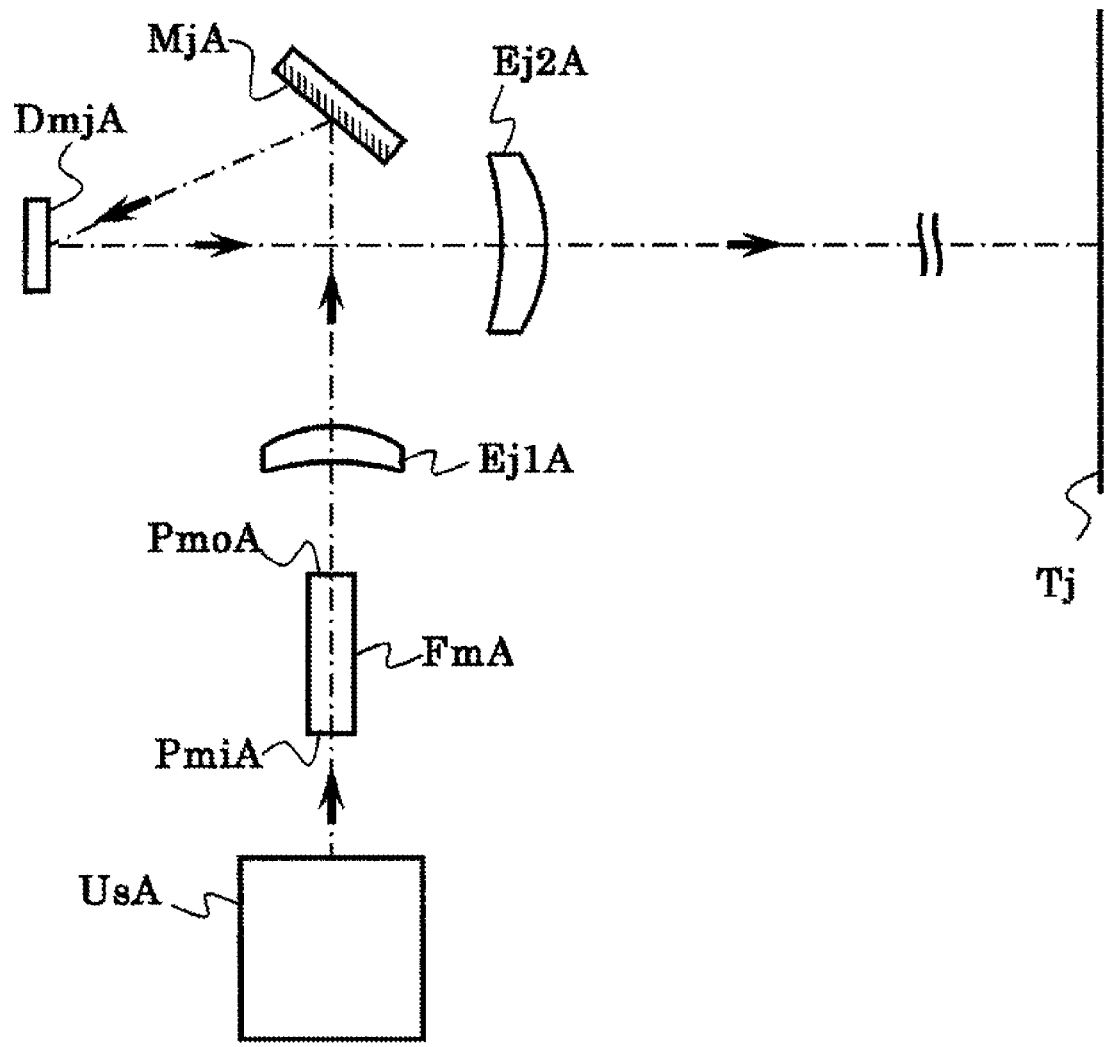
FIG. 10 is a principle diagram for explaining part of a kind of conventional projector concerning a discharge lamp lighting apparatus according to an embodiment of the present invention.
Figure 11:
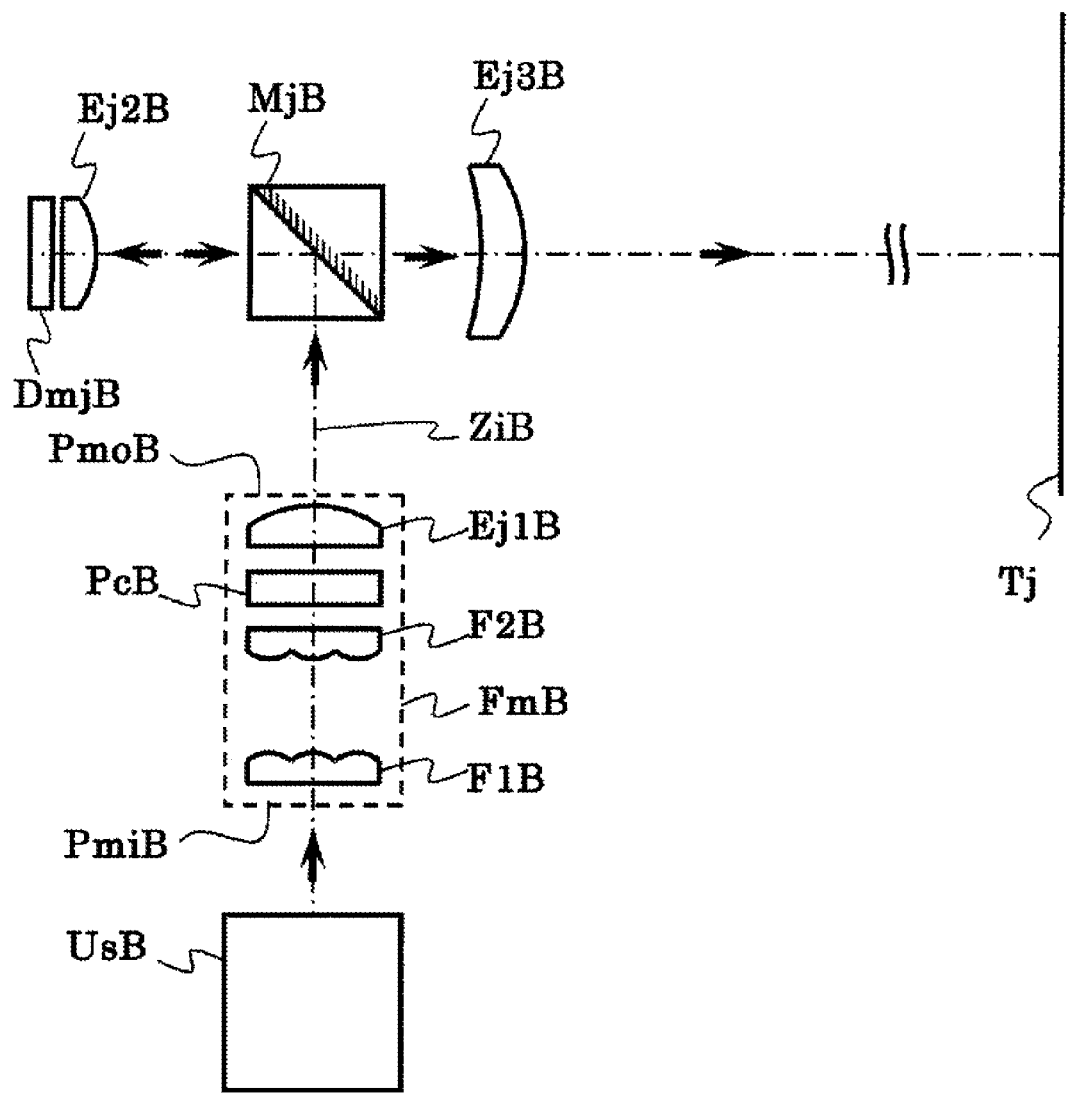
FIG. 11 is a principle diagram for explaining part of a kind of conventional projector concerning a discharge lamp lighting apparatus according to an embodiment of the present invention.

Although no reference is made to relation of the discharge lamp lighting apparatus and the projector according to the embodiments of the present invention and colorization of an image, the technology of conventional colorization which is also described in the explanation of FIGS. 10 and 11, can be realized by merely adding it to the technology of the discharge lamp lighting apparatus and projector which are described in the specification of the present invention.

For convenience of explanation, although in the present specification, the electric supply control circuit (Fx) shown in, for example, FIG. 5, or the inverter control circuit (Uf) shown in FIGS. 3 and 7, is configured with, for example, a logic gate or a flip-flop, in actual apparatus design, it is preferable to realize a function, which exhibited by such a circuit, by program processing using a microprocessor.

In such case, what is necessary is to replace the various counters, which are described in this specification, with variables on a program so as to carry out the operation described this specification. For example, it is possible to freely make such a replacement based on convenience of programing, so as to detect whether a specified value is reached by incrementing it from zero as explained in this specification or, conversely, so as to detect whether it reaches zero by decrementing from a specified value. Moreover, it possible to devise a configuration in order to realize such a function exhibited using two or more counters by counters whose number is smaller than that. Therefore, the description in this specification does not specify the program structure, and the function to be achieved is described. The configuration and configuration method provided in this specification is to help understanding the above-mentioned function and to explain that such function can be realized in view of engineering.

Not only in such digital signal processing but also in control of applied electric power to the discharge lamp (Ld) involving analog signals such as the above-mentioned lamp current detection signal (Si) and the above-mentioned lamp voltage detection signal (Sv), which is not described above in detail in this specification, for example, a signal analogically inputted may be converted to digital signal by an AD conversion in an input side, and outputted based on digital data generated by the digital operation in a microprocessor, thereby realizing a desired function or if necessary, it may be changed by a DA conversion into and output an analog signal. It is especially suitable as a configuration method of the circuit according to the embodiments of the present invention to realize it by using a dedicated IC generally called DSP (digital signal processor) wherein such processing function is integrated into one IC.

The present invention can be used in the industries of designing and manufacturing a discharge lamp lighting apparatus for lighting a high pressure discharge lamp, specifically a high-pressure mercury lamp, a metal halide lamp, and a xenon lamp.

The preceding description has been presented only to illustrate and describe exemplary embodiments of the present discharge lamp lighting apparatus and projector. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A discharge lamp lighting apparatus comprising:
    an electric supply circuit (Ux) which causes a discharge lamp (Ld) to maintain electric discharge, and supplying predetermined electric power thereto;
    an inverter (Ui) for carrying out polarity reversal of output voltage of the electric supply circuit (Ux) which is applied to the discharge lamp (Ld); and
    an inverter control circuit (Uf) which receives a polarity reversal notification signal (So) to be inputted from an outside in order to give a notice of polarity-reversal timing (h0, h1, h2, . . . ) of the inverter (Ui), and generates an inverter polarity phase signal (Sf1, Sf2), which specifies a polar phase of the inverter (Ui),
    wherein the inverter control circuit (Uf) has a polarity-reversal control circuit (Ufc) which manages a polarity-reversal operation of the inverter (Ui) based on the polarity reversal notification signal (So), and an inverter polarity phase generation circuit (Ufp) which generates the inverter polarity phase signal (Sf1, Sf2),
    wherein the polarity-reversal control circuit (Ufc) gives a polarity-reversal order signal (Sr) to the inverter polarity phase generation circuit (Ufp), as a basic operation, every time the polarity-reversal control circuit (Ufc) recognizes polarity-reversal timing (h0, h1, h2, . . . ), which is notified by the polarity reversal notification signal (So), so that the polarity of the inverter (Ui) is inverted, and
    wherein the polarity-reversal control circuit (Ufc) counts the number of times of consecutive appearances Np of a normal polarity-reversal interval period (Tn0, Tn1, . . . ), in which an interval of adjoining polarity-reversal timings (h0, h1, h2, . . . ) notified by the polarity reversal notification signal (So), is equal to or less than an upper limit Tsup of a polarity-reversal interval desirable for the discharge lamp (Ld), when a polarity-reversal interval period (Te, Te', . . . ), in which the interval of the adjoining polarity-reversal timings (h0, h1, h2, . . . ) is longer than the upper limit Tsup of the polarity-reversal interval, appears, an operation for memorizing a number of times of maximum consecutive appearances Npm as a maximum value of the number of times of consecutive appearances Np, and resetting the number of times of consecutive appearances Np, is continued, so that after that, by receiving the polarity reversal notification signal (So) by which the number of times of consecutive appearances Np becomes equal to the number of times of maximum consecutive appearances Npm, a start of the unusual polarity-reversal interval period (Te, Te', . . . ) is recognized and appearance of the unusual polarity-reversal interval period (Te, Te', . . . ) is detected by prediction, whereby the polarity-reversal order signal (Sra), which is additional, is given to the inverter polarity phase generation circuit (Ufp) before passage of the upper limit Tsup of the polarity-reversal interval from the start of the unusual polarity-reversals interval period (Te, Te', . . . ).

2. The discharge lamp lighting apparatus according to claim 1, wherein the additional polarity-reversal order signal (Sra) is given at timing which is obtained by approximately equally dividing the unusual polarity-reversal interval period (Te, Te', . . . ).

3. The discharge lamp lighting apparatus according to claim 2, wherein when the number of times of the polarity-reversal order signal (Sr) in one cycle of a time series of issue of the polarity-reversal order signal (Sr) from the polarity-reversal control circuit (Ufc) including the additional polarity-reversal order signal (Sr), is even times, the inverter control circuit (Uf) inserts intermittently an operation so as not to give a series of odd number of times of J polarity-reversals trigger signal (Srp) to the inverter polarity phase generation circuit (Ufp).

4. The discharge lamp lighting apparatus according to claim 3, wherein the inverter control circuit (Uf) inserts an operation in which a series of even times part of the polarity-reversals trigger signal (Srp) is not given to the inverter polarity phase generation circuit (Ufp) between an operation in which a series of odd number of times part of the polarity-reversal trigger signal (Srp) is not given to the inverter polarity phase generation circuit (Ufp), and a next operation in which a series of odd number of times part of the polarity-reversals trigger signal (Srp) is not given to the inverter polarity phase generation circuit (Ufp).

5. A projector comprising:
a two-dimensional light amplitude modulation element (Dm) in which a large number of pixels capable of amplitude modulation with respect to emitted light is arranged in form of two-dimensional array;
a two-dimensional light amplitude modulation element driving circuit (Um) which drives the two-dimensional light amplitude modulation element (Dm) according to an image signal;
a discharge lamp (Ld) which is a light source for illuminating the two-dimensional light amplitude modulation element (Dm);
the discharge lamp lighting apparatus (Uw) for lighting the discharge lamp (Ld) according to claim 1;
an illumination optical system (Ij) which converts light of the discharge lamp (Ld) into illumination light flux which illuminates the two-dimensional light amplitude modulation element (Dm); and
a projection optical system (Ej) including an image forming optical element for projecting and displaying an image of the two-dimensional light amplitude modulation element (Dm) on a screen (Tj),
wherein while the two-dimensional light amplitude modulation element driving circuit (Um) controls an optical modulation operation of the pixels, the polarity reversal notification signal (So) is generated, so as to be input into the discharge lamp lighting apparatus (Uw).

6. A discharge lamp lighting apparatus comprising:
an electric supply circuit (Ux) which causes a discharge lamp (Ld) to maintain electric discharge, and supplies predetermined electric power thereto;
an inverter (Ui) which carries out polarity reversal of output voltage of the electric supply circuit (Ux) to be applied to the discharge lamp (Ld); and
an inverter control circuit (Uf) which receives a polarity reversal notification signal (So) to be inputted from an outside in order to give a notice of polarity-reversal timing (h0, h1, h2, . . . ) of the inverter (Ui), and generates an inverter polarity phase signal (Sf1, Sf2) which specifies a polar phase of the inverter (Ui),
wherein the inverter control circuit (Uf) has a polarity-reversal control circuit (Ufc) which manages a polarity-reversal operation of the inverter (Ui) based on the polarity reversal notification signal (So), and an inverter polarity phase generation circuit (Ufp) which generates the inverter polarity phase signal (Sf1, Sf2),
wherein, the polarity-reversal control circuit (Ufc) gives a polarity-reversal order signal (Sr) to the inverter polarity phase generation circuit (Ufp), as a basic operation, each time the polarity-reversal control circuit (Ufc) recognizes the polarity-reversal timing (h0, h1, h2, . . . ), which is notified by the polarity reversal notification signal (So), so that a polarity of the inverter (Ui) is inverted,
wherein the polarity reversal notification signal (So) gives a notification about a possibility that a period after the polarity reversal, which starts from a notification of timing notified by the polarity reversal notification signal (So), with the polarity-reversal timing (h0, h1, h2, . . . ), becomes an unusual polarity-reversal interval period (Te, Te', . . . ), which is longer than the upper limit Tsup of a polarity-reversals interval desirable for the discharge lamp (Ld), is predicted, and the unusual polarity-reversal interval warning (Se) which indicates truth when a period during which there is the possibility, and false when a period during which there is not the possibility is predicted, is added thereto,
wherein the polarity-reversal control circuit (Ufc) receives the polarity reversal notification signal (So), determines whether the unusual polarity-reversal interval warning (Se) is true or false, confirms, based on the count value Ntf of the period measurement elapsed-time counter (Ftc), whether an after-polarity-reversal period after the possibility of the unusual polarity-reversal interval period (Te, Te', . . . ) is predicted by the unusual polarity-reversal interval warning (Se) which indicates truth, is actually the unusual polarity-reversals interval period (Te, Te', . . . ), continues an operation for memorizing the unusual polarity-reversal interval period appearance information (Sz) which indicates truth when the unusual polarity-reversal interval period (Te, Te', . . . ) is confirmed, and for memorizing the unusual polarity-reversal interval period appearance information (Sz) which indicates false when the unusual polarity-reversal interval period (Te, Te', . . . ) is not confirmed,
wherein when the unusual polarity-reversal interval period appearance information (Sz) is truth, and when the polarity-reversal control circuit (Ufc) receives the polarity reversal notification signal (So) to which the true unusual polarity-reversal interval warning (Se) is added, it is regarded as a start of the unusual polarity-reversal interval period (Te, Te', ... ), so that appearance of the unusual polarity-reversal interval period (Te, Te', ... ) is detected by prediction, at time when the after polarity reversal period starts, in which the possibility that the period becomes the unusual polarity-reversal interval period (Te, Te', ... ) is predicted by the unusual polarity-reversal interval warning (Se), whereby the additional polarity-reversal order signal (Sra) is given to the inverter polarity phase generation circuit (Ufp) before passage of the upper limit Tsup of the polarity-reversal interval from the start of the unusual polarity-reversals interval period (Te, Te', ... ).

7. The discharge lamp lighting apparatus according to claim 6, wherein the unusual polarity-reversal interval warning (Se) is a binary signal which shows a high level or a low level in polar character and is outputted before the polarity-reversal timing (h0, h1, h2, ... ) as a predetermined polarity signal, and wherein the polarity-reversal control circuit (Ufc) receives the unusual polarity-reversal interval warning (Se) which is binary, and determines whether the unusual polarity-reversal interval warning is true or false.

8. The discharge lamp lighting apparatus according to claim 6, wherein the polarity reversal notification signal (So) is notified by multi-bit numerical data, wherein the polarity-reversal timing information to which a true unusual polarity-reversal interval period (Te, Te', ... ) warning is attached, and the polarity-reversals timing information to which a fake unusual polarity-reversal interval period (Te, Te', ... ) warning is attached, are respectively defined by corresponding constant values, and wherein the polarity-reversal control circuit (Ufc) receives the multi-bit polarity reversal notification signal (So), judges whether the received numerical data is in agreement with any of the corresponding constant values, and acquires polarity-reversal timing information while recognizing the truth of the unusual polarity-reversal interval warning (Se), or false thereof.

9. The discharge lamp lighting apparatus according to claim 6, wherein the polarity reversal notification signal (So) is a binary signal and also a pulse signal which shows a high level or a low level in polar character, and the polarity reversal notification signal (So) is inverted to one polarity before the polarity-reversal timings (h0, h1, h2, ... ), and gives a notification of the polarity-reversal timings (h0, h1, h2, ... ) at transition timing when the polarity reversal notification signal (So) returns to the other polarity, wherein the truth or false of the unusual polarity-reversal interval warning (Se) is expressed depending on whether the length of a period from reversal to the one polarity until returning to the other polarity, is longer or shorter than a predetermined duration, wherein the polarity-reversal control circuit (Ufc) receives the polarity reversal notification signal (So), which is binary, judges whether the length of a period from reversal to the one polarity until returning to the other polarity is longer or shorter than the predetermined duration, thereby recognizing the truth or false of the unusual polarity-reversal interval warning (Se), and acquires the polarity-reversal timing information at the transition timing at which the polarity reversal notification signal (So) returns to the other polarity.

* * * * *